United States Patent [19]
Merrill et al.

[11] Patent Number: 6,160,663
[45] Date of Patent: Dec. 12, 2000

[54] FILM CONFINED TO A FRAME HAVING RELATIVE ANISOTROPIC EXPANSION CHARACTERISTICS

[75] Inventors: William W. Merrill, White Bear Lake; John C. Harvey, Woodbury, both of Minn.; Reney R. Langlois, River Falls, Wis.; Michael W. Mills, St. Paul, Minn.; Rosalind E. Peebles, Chicago, Ill.; Fred J. Roska, Woodbury, Minn.

[73] Assignee: 3M Innovative Properties Company, St. Paul, Minn.

[21] Appl. No.: 09/164,841

[22] Filed: Oct. 1, 1998

[51] Int. Cl.$^7$ .............................. A47G 1/06; G02B 5/30
[52] U.S. Cl. .................... 359/500; 359/494; 359/896; 40/701; 40/710
[58] Field of Search .................. 349/9, 58, FOR 125; 40/701, 710; 359/500, 892, 820, 896, 483, 492, 494, 501, 900; 362/19; 353/20

[56] References Cited

U.S. PATENT DOCUMENTS

| | | | |
|---|---|---|---|
| 2,917,855 | 12/1959 | Schneider | 40/701 |
| 3,068,162 | 12/1962 | Roche . | |
| 3,425,148 | 2/1969 | Reese | 40/701 |
| 3,585,255 | 6/1971 | Sevenich | 260/873 |
| 3,649,100 | 3/1972 | Kirst | 40/701 |
| 4,066,925 | 1/1978 | Dickson | 313/503 |
| 4,138,620 | 2/1979 | Dickson | 313/1 |
| 4,329,396 | 5/1982 | Kropp | 428/354 |
| 4,443,397 | 4/1984 | Hahn et al. | 264/171 |
| 4,780,643 | 10/1988 | Ellis et al. | 313/503 |
| 4,952,023 | 8/1990 | Bradshaw et al. | 362/29 |
| 5,162,827 | 11/1992 | Marshall | 40/710 |
| 5,238,738 | 8/1993 | Miller | 428/333 |
| 5,260,827 | 11/1993 | Dziekan | 359/500 |
| 5,325,218 | 6/1994 | Willett et al. | 353/122 |
| 5,333,072 | 7/1994 | Willett . | |
| 5,422,756 | 6/1995 | Weber | 359/487 |
| 5,506,704 | 4/1996 | Broer et al. | 359/500 |

(List continued on next page.)

FOREIGN PATENT DOCUMENTS

| | | | |
|---|---|---|---|
| 724101 | 12/1965 | Canada | 154/122 |
| 573905 | 12/1993 | European Pat. Off. | G02B 27/28 |
| 406095110 | 4/1994 | Japan . | |
| WO 94/29765 | 12/1994 | WIPO | B29C 59/04 |
| WO 95/27919 | 4/1995 | WIPO | G02B 27/28 |

(List continued on next page.)

OTHER PUBLICATIONS

W. Nowacki, "New Trends of Investigation in Thermoelasticity",*Thermoelasticity*, pp 585–589, 1962.

S. G. Lekhnitskii, "The Simplest Cases of Elastic Equilibrium", *Theory of Elasticity of an Anisotropic Body*, Mir Publishers, English Translation, pp 79–89, 1981.

H. S. Carslaw and J. C. Jaeger, "Conduction of Heat in an Anisotropic Solid", *Conduction of Heat in Solids*, Oxford University Press, Second Edition, pp 38–49, 1959.

T. C. T. Ting, "Thermo–Anisotropic Elasticity", *Anisotropic Elasticity: Theory and Applications*, Oxford University Press, pp. 506–511, 1996.

Primary Examiner—Cassandra Spyrou
Assistant Examiner—John Juba, Jr.
Attorney, Agent, or Firm—Robert J. Pechman

[57] ABSTRACT

An assembly comprising a film bounded by a frame, the film having a first thermal expansion coefficient along a first direction parallel to the film and a second thermal expansion coefficient along a second direction parallel to the film, wherein thermal expansion of the film compared to that of the frame is greater along the first direction than along the second direction, and wherein the film has a shape at an ambient reference temperature different from that of the frame, the shape of the film being selected to reduce clearance while allowing sufficient room between the film and the frame for thermal expansion in the first direction for temperatures up to a predetermined elevated reference temperature.

11 Claims, 6 Drawing Sheets

Microfiche Appendix Included
(2 Microfiche, 140 Pages)

U.S. PATENT DOCUMENTS

| | | | |
|---|---|---|---|
| 5,559,634 | 9/1996 | Weber | 359/638 |
| 5,686,979 | 11/1997 | Weber et al. | 349/96 |
| 5,691,789 | 11/1997 | Li et al. | 349/98 |
| 5,699,188 | 12/1997 | Gilbert et al. | 359/584 |
| 5,721,603 | 2/1998 | De Vaan et al. | 349/194 |
| 5,729,310 | 3/1998 | Horiuchi et al. | 349/58 |
| 5,754,337 | 5/1998 | Burns et al. | 359/515 |
| 5,759,467 | 6/1998 | Carter et al. | 264/173.12 |
| 5,771,328 | 6/1998 | Wortman et al. | 385/146 |
| 5,783,120 | 7/1998 | Ouderkirk et al. | 264/1.34 |
| 5,783,283 | 7/1998 | Klein et al. | 428/141 |
| 5,787,624 | 8/1998 | Gerum | 40/710 |
| 5,825,542 | 10/1998 | Cobb, Jr. et al. | 359/487 |
| 5,825,543 | 10/1998 | Ouderkirk et al. | 359/494 |
| 5,828,488 | 10/1998 | Ouderkirk et al. | 359/487 |
| 5,872,653 | 2/1999 | Schrenk et al. | 359/498 |
| 5,877,903 | 3/1999 | Adachi | 359/820 |
| 5,882,774 | 3/1999 | Jonza et al. | 428/212 |

FOREIGN PATENT DOCUMENTS

| | | | |
|---|---|---|---|
| 17303 | 6/1995 | WIPO . | |
| WO 95/17691 | 6/1995 | WIPO | G02B 5/30 |
| WO 95/17692 | 6/1995 | WIPO | G02B 5/30 |
| WO 95/17699 | 6/1995 | WIPO | G02F 1/1335 |
| 19347 | 6/1996 | WIPO . | |
| WO 97/01440 | 1/1997 | WIPO | B32B 27/36 |
| WO 97/01774 | 1/1997 | WIPO | G02B 1/10 |
| 08135 | 2/1998 | WIPO . | |
| 11275 | 3/1998 | WIPO . | |

FILM CONFINED TO A FRAME HAVING RELATIVE ANISOTROPIC EXPANSION CHARACTERISTICS

This disclosure includes a Microfiche Appendix of 2 microfiche consisting of a total number of 140 frames.

FIELD OF THE INVENTION

The present invention generally relates to planar materials bounded by a frame, where the frame material and the planar materials have different expansion characteristics, at least one of which materials having anisotropic expansion characteristics.

BACKGROUND OF THE INVENTION

Anisotropic materials have properties that are directionally dependent. The elastic behavior of such materials has been discussed extensively in S. G. Leknitskii, *Theory of Elasticity of an Anisotropic Body* (English Translation, Mir Publishers, Moscow, 1981) and in T. C. T. Ting, *Anisotropic Elasticity* (Oxford University Press, New York, 1996). One observation of these studies is that the directions of principal stress and strain do not necessarily coincide. Another observation is that when anisotropic elements in the form of rectangular parallelepipeds are deformed under stress, they are deformed into oblique parallelepipeds. In two dimensions, this means that under stress, a rectangle becomes an oblique, or non-right, parallelogram.

Thermal expansion principals can be formulated in terms of elastic theory. As such, thermal expansion can likewise cause shape changes. H. S. Carslaw and J. C. Jaeger, *Conduction of Heat in Solids* (Oxford University Press, New York 1959), discloses that a circular cylinder having its expansion axis along one of the principal axes becomes an elliptic cylinder upon heating. However, in most treatments, thermal expansion is treated as an isotropic phenomenon, although the possibility of anisotropic thermal expansion has been recognized.

Despite the body of theory, few practicable applications have been taught. In U.S. Pat. No. 3,068,162 (Roche), the design of slot and key systems for the design of nuclear moderator structures is described in which the minimization of tolerances is important. However, Roche only describes a system for assembling together two pieces having substantially identical anisotropic expansions in which the orthogonal principal axes of expansion of one piece coincide with the orthogonal principal axes of expansion of the other piece.

SUMMARY OF THE INVENTION

Despite a general understanding in the art of thermal expansion and the behavior of anisotropic materials, a need exists for an understanding of the thermal expansion of generally planar anisotropic materials confined in a space bounded by another material having different thermal expansion characteristics.

The present invention considers the case in which two materials, a bounding material and a bounded material, have significantly different anisotropic expansions. Specifically, the present invention provides a method to optimize the size, shape, and positioning of a film or sheet-like bounded material having anisotropic expansion characteristics so that upon expansion under operating conditions, the film remains properly fitted within the constraints of the bounding material.

The present invention is applicable generally to articles or constructions in which one or more materials must fit inside a frame or bounding surface while under the influence of factors which cause dimensional changes, where the dimensional changes of the bounded articles differ from the dimensional changes of the bounding article. Factors which can cause dimensional changes include varying temperature, humidity, pressure, and/or loss of material (for example, volatilization of plasticiser). The present invention is also applicable to a variety of three-dimensional systems in which the interlocking pieces may be designed by considering planar cross-sections.

The present invention is believed to be particularly suited to cases where the bounded material is a film or a sheet. In these cases, one concern may be expansion of the film against the bounding surface causing the film to buckle, or warp, in the thickness direction. The film or sheet, as well as the frame or bounding surface, may be made of a variety of materials, including polymers, metals, and glasses, so that the composite or homogeneous film or sheet has thermal expansion characteristics differing from those of the frame or bounding surface; and, that at least one of these has anisotropic thermal expansion characteristics.

For descriptive purposes, the bounding material will be defined as the frame and the bounded material will be defined as the film. The film will be assumed to be substantially planar. As such, the film is assumed substantially flat in the x-y plane with the z-direction coincident with the thin, thickness direction of the film. The present invention includes combinations of isotropic films in anisotropic frames, anisotropic films in isotropic frames, and anisotropic films in anisotropic frames. The film may perform a variety of functions, including aesthetic, mechanical, optical or light management, or other such functions.

The present invention is particularly suited for electronic display technology. Electronic displays often contain films confined within a frame. Many such films manage light by controlling polarization, direction, intensity, and uniformity. Films having these functions can have anisotropic thermal expansion characteristics coincident with their directionally-dependent optical functionality. In addition, it is often preferable for the operation of the display to orient the film with its thermal expansion axes oriented at angles with respect to the edges of the frame. These light management films (usually 1 to 500 microns thick) can be positioned in a frame, and can be free-floating, loosely secured in the frame by a flange to help keep the plane of the film normal to the light path, or rigidly secured by lamination to a thicker plate (or otherwise) to keep the film from moving altogether.

Examples of light management films include diffuser films, reflective polarizing films, diffuse reflecting polarizing films, cholesteric liquid crystal containing films, brightening films, mirror films, retardation films, and compensator films. These films may operate over a variety of frequencies and over wide or narrow frequency bands. Frequency bands of particular interest include the ultraviolet, visible and infrared portions of the electromagnetic. spectrum. Particularly useful examples include the following as disclosed in the cited references which are incorporated by reference herein: multilayer uniaxially oriented reflective polarizing films and multilayer mirror films as described in published patent applications WO 95/17303 and WO 96/19347, diffusely reflecting polarizing films and diffusely reflecting mirror films as described in U.S. Pat. No. 5,783,120 and co-pending patent application Ser. No. 09/006455, and cholesteric reflective polarizers as described in U.S. Pat. Nos. 5,506,704; 5,721,603; 5,691,789; 5,325,218; and in published patent applications WO 98/11275 and WO 98/08135.

Light management films can be produced by industrial processes which may result in a high degree of orientational anisotropy in the plane of the film. Orientational anisotropy can cause the film to have anisotropic thermal expansion characteristics resulting in thermal expansion or contraction of the film which varies depending on direction in the film plane. The principal axes of thermal expansion are the directions in the film plane in which the coefficient of thermal expansion has a maximum value and a minimum value. Often, the principal axes of thermal expansion are substantially orthogonal. The coefficients of thermal expansion along the principal axes of thermal expansion are referred to as the principal values of thermal expansion.

As taught in several embodiments of this invention, the optimum shape of a bounded film will be different from that of the frame when the expansion characteristics of the film differ from those of the frame. For example, in the case of a rectangular frame (a common frame shape), housing an anisotropic film whose principal axes of thermal expansion do not coincide with the edges of the frame, the optimum shape of the film will generally be non-rectangular, contrary to the conventional method used in the art which simply provides a smaller rectangular film for uniform clearance in the frame.

The trend in the LCD display industry is to maximize the viewing area of a display while minimizing its physical size. In the process, the area of clearance available for film expansion within the frame is sacrificed. This places ever more importance on optimal cutting of films to allow sufficient expansion clearance without wasting space. Present industry tolerances are such that 1 mm cannot be spared. Apart from these concerns, excessive clearance may not be desirable in that it can allow too much freedom of movement of the films within the frame. Often, films are loosely secured within the frame housing by a flange, which covers the frame, and whose inner annular region defines the edges of the viewing area of the display. The flange is designed to maintain the film within the frame cavity. Excessive clearance may allow the film edges to move out of the flange during routine handling of the display. If this occurs the optical performance of the display can be adversely affected because the film no longer covers the entire display area. Therefore, for optimum performance, the films should be cut large enough to remain housed in the frame and to minimize clearance to provide for the largest possible viewing area, and small enough to minimize contact with the internal edges of the frame to maintain low compressive stresses in the film under thermal conditions expected during operation.

By way of contrast, conventional methods involve cutting the film smaller than the frame and matching the shape of the frame. The film is then tested under conditions of interest. If the film is too large, a smaller film having the same shape is cut. This process proceeds by trial and error until a workable film size is found. While this method can eliminate film warping, it does not reduce clearance, and indeed increases clearance. The present invention addresses the deficiencies in the art by simultaneously reducing clearance and minimizing warping.

In one embodiment, the present invention provides an assembly which includes a frame having an internal bounding edge enclosing a substantially rectangular internal area and a substantially planar anisotropic film contained within the bounding edge of the frame. The film has a first thermal direction in the plane of the film and a second thermal expansion direction in the plane of the film, the second expansion direction having a lower thermal expansion coefficient than the first expansion direction. The film is shaped so that the film has at least two principal edges which join at a non-right angle, the angle being selected to reduce clearance along the second direction while allowing sufficient room between the film and the frame for thermal expansion along the first direction.

In another embodiment, the present invention provides an assembly which includes a frame having an internal bounding edge enclosing an internal area, the bounding edge having a shape defined by a set of boundary edge vertices in an x-y plane, and a film contained within the frame. The film has a first coefficient of thermal expansion positioned along a first expansion axis in the x-y plane and a second coefficient of thermal expansion positioned along a second expansion axis in the x-y plane, the first coefficient of expansion being greater than the second coefficient of expansion. The shape of the film at an ambient reference temperature is different from the shape of the bounding edge of the frame, the shape of the film being selected to reduce clearance and to allow sufficient room for expansion of the film along the first expansion axis for temperatures up to a predetermined elevated reference temperature. The maximum shape of the film at the ambient reference temperature is given by a set of maximum film edge vertices in the x-y plane determined according to $$R_S^0 = O_S^0 + (Q_S^+ \cdot D_S^+)^{-1} \cdot (-O_S^0 - Tr_S^+) + (Q_S^+ \cdot D_S^+)^{-1} \cdot D_B^+ \cdot R_B^0$$

wherein $R_S^0$ is the set of maximum film edge vertices at the ambient reference temperature, $R_B^0$ is the set of boundary edge vertices at the ambient reference temperature, $D_S^+$ is an expansion displacement ratio tensor for the film, $D_B^+$ is an expansion displacement ratio tensor for the frame, $O_S^0$ is a center of rotation of the film, $Tr_S^+$ is a solid body translation of $O_S^0$, and $Q_S^+$ is a solid body rotation tensor for the film.

In still another embodiment, the present invention provides a method for sizing an anisotropic film to fit in a frame. The first step is determining a set of vertices in an x-y plane defining an area enclosed by a frame. Next, a substantially planar film is provided, the film having a first coefficient of thermal expansion along a first expansion axis in the plane of the film and a second, different, coefficient of thermal expansion along a second, different, expansion axis in the plane of the film. The next step is calculating a set of maximum film edge vertices in the x-y plane given an ambient reference temperature and an elevated reference temperature higher than the ambient reference temperature using the formula $$R_S^0 = O_S^0 + (Q_S^+ \cdot D_S^+)^{-1} \cdot (-O_S^0 - Tr_S^+) + (Q_S^+ \cdot D_S^+)^{-1} \cdot D_B^+ \cdot R_B^0$$

wherein $R_S^0$ is the set of maximum film edge vertices at the ambient reference temperature, $R_B^0$ is the set of boundary edge vertices at the ambient reference temperature, $D_S^+$ is an expansion displacement ratio tensor for the film, $D_B^+$ is an expansion displacement ratio tensor for the frame, $O_S^0$ is a center of rotation of the film, $Tr_S^+$ is a solid body translation of $O_S^0$, and $Q_S^+$ is a solid body rotation tensor for the film. Finally, the film is cut to have a size and an orientation at the ambient reference temperature selected to reduce clearance, the size being no larger than an area defined by the set of maximum film edge vertices calculated in the calculating step.

In yet another embodiment, the present invention provides an assembly which includes a frame having an internal bounding edge enclosing an internal area and an anisotropic film having principal edges contained within the internal area of the frame. The frame and film are also provided with a positioning system which includes one or more protrusions or indentions at the principal edges of the film and one or more protrusions or intentions at the bounding edge of the frame. The protrusions or indentions of the frame complement the positions, shapes, and sizes of the protrusions or indentions at the principal edges of the film. The positioning system fixes at least one point of the film from moving relative to the frame in at least one direction parallel to the film due to thermal expansion of the film for temperatures ranging between a predetermined ambient reference temperature and a predetermined elevated reference temperature.

BRIEF DESCRIPTION OF THE DRAWING

The invention may be more completely understood in consideration of the following detailed description of the various embodiments of the invention in connection with the accompanying drawings, in which.

DETAILED DESCRIPTION

Figure 1:
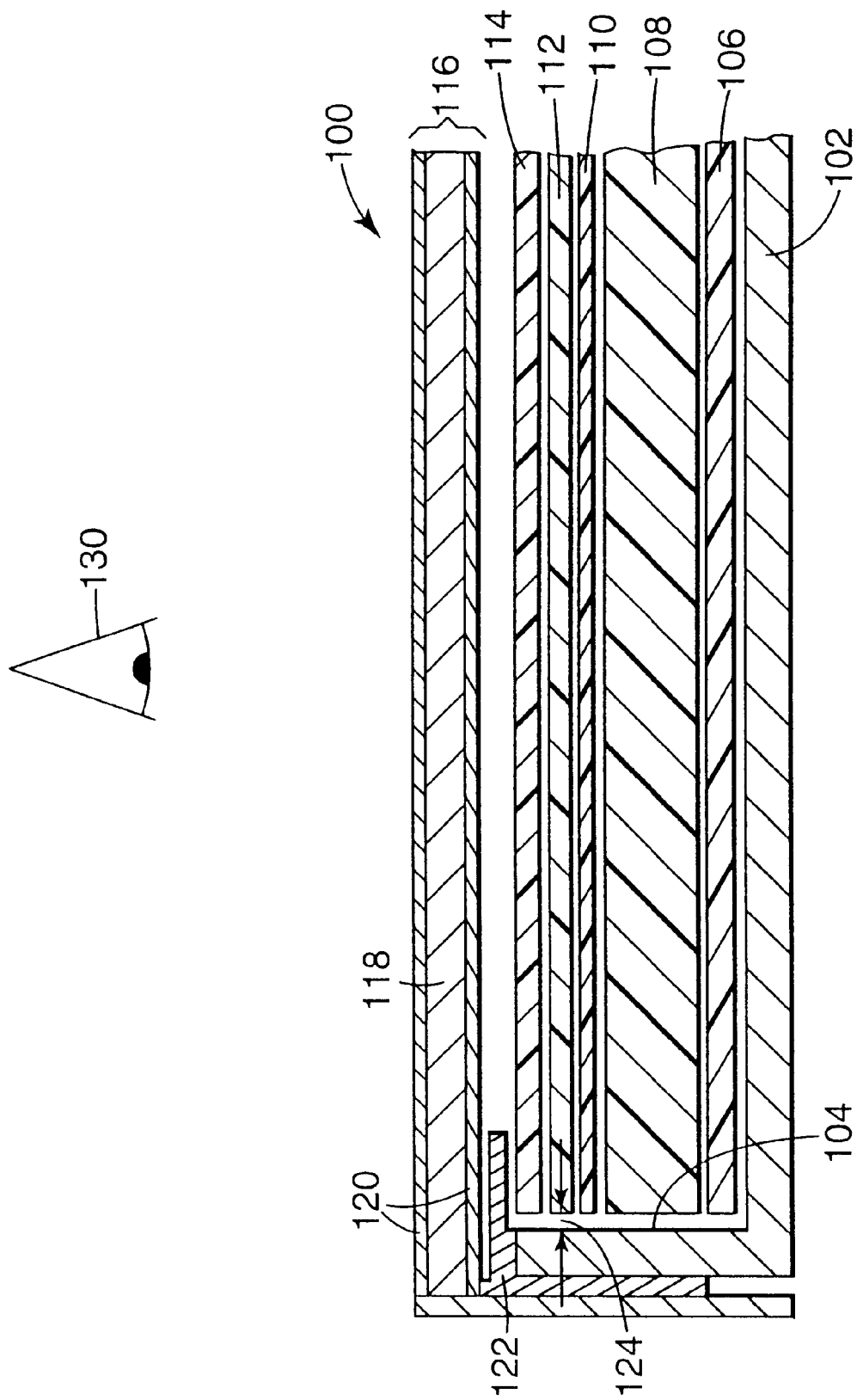
FIG. 1 shows a partial schematic cross-section of a liquid crystal display assembly.

The following terms should be understood in the description of the present invention according to the meanings ascribed below:

"x-y plane" refers to any of a set of parallel planes indicating the general orientation of the planar bounded material and planar bounding material of the present invention. In the case of a display assembly, the x-y plane is a plane perpendicular to the net direction of light output. The horizontal direction will be understood as the x-direction in the x-y plane and the vertical direction will be understood as the y-direction in the x-y plane.

"z-direction" refers to the direction perpendicular to the x-y plane and generally corresponds to the thickness direction of the planar bounded material of the present invention.

"frame" refers to an object having internal bounding edges enclosing a substantially planar area in the x-y plane.

"anisotropic film" refers to a substantially planar film or sheet of material having anisotropic expansion characteristics in the plane of the film or sheet.

"clearance" refers to an area located between the film and the internal bounding edges of the frame.

"play" refers to the amount of film movement in the frame allowed by clearance.

"slippage" refers to movement of the film resulting in edges of the film lying outside of a desired region in the frame.

"warping" refers to buckling of the film in the thickness direction due to compressive stresses in the plane of the film resulting from contact between the film edges and the internal bounding edges of the frame.

"free floating" and "loosely secured" refer to the mounting of a film in a frame such that the film has at least some freedom of motion in at least one direction.

"planar" is used to refers to an object having dimensions in two orthogonal directions substantially greater than its dimension in a third orthogonal direction, the third orthogonal direction usually called the thickness.

"reference temperature" refers to a temperature condition selected for its significance in a given application. For example, room temperature, assembly temperature, film cutting temperature, preferred operating temperature, maximum operating temperature, minimum operating temperature, maximum testing conditions temperature, and minimum testing conditions temperature can be chosen as reference temperatures. The choice of a reference temperature will be apparent to the ordinarily skilled artisan. By convention, "ambient reference temperature" refers to a predetermined initial reference temperature, normal reference temperature, or preferred operating temperature and "elevated reference temperature" refers to a predetermined temperature higher than the ambient reference temperature which is at or above the highest operating temperature of interest.

"centroid" refers to the center of mass of an object.

"tab" refers to a planar protrusion on the edge of the film or the internal boundary of the frame of the present invention. A tab cavity is an indention is the internal boundary of the frame of the present invention coincident with a possible tab position for a corresponding film of the present invention.

"slot" refers to a planar indention at the edge of the film of the present invention or a hole in the film of the present invention. A slot in the film may require a corresponding pin or other structure in the frame.

Illustration of Various Embodiments of the Present Invention

While the present invention is generally applicable to films confined in frames and subjected to conditions under which expansion can occur, the present invention is uniquely suited for applications involving anisotropic optical films in electronic displays. Without losing generality, the various aspects of the present invention can be visualized using the example of a liquid crystal display.

In many instances, it is desirable to include a reflective polarizing film in a display assembly. For functionality in conjunction with an LCD panel, such reflective polarizing films are preferably oriented with their polarization axes at an angle with respect to the edges of the frame in which they are contained. Because these films often have anisotropic thermal expansion characteristics with directionalities coincident with their polarization axes, the films can thermally expand more along certain directions than along others. These directions do not generally match the thermal expansion characteristics of the frame. The result is a reflective polarizing film that tends to thermally expand along one direction more than others. If the film is sized too large, the film can contact the frame along the greater thermal expansion directions, and warping can occur. If the film is sized to take anisotropic thermal expansion into account, the film can be so small as to limit the viewing area and increase clearances. The present invention simultaneously addresses these problems by providing a film having a shape different from the shape of the frame, the shape of the film being selected to reduce clearance while allowing sufficient room for thermal expansion along the direction of maximum expansion.

FIG. 1 shows a partial cross-section of an LCD assembly 100. The assembly 100 is substantially planar, and is shown in FIG. 1 with its various components stacked in the z-direction with the front of the display located proximate an observer 130. Frame 102 has bounding edge 104 which confines several display components which can optionally include, among other components, a light guide 108, a reflector 106 located behind light guide 108, a diffuser film 110, a brightening film 112, and a reflective polarizer film 114. An area of clearance 124 is often provided between the frame and the components in the frame. Several of the films in the frame can have anisotropic thermal expansion characteristics, including reflector 106, diffuser 110, brightening film 112, and reflective polarizer film 114. Optional flange 122 helps to confine the components in the frame in the z-direction. Flange 122 can also determine the viewing area of the display. LCD panel 116 is provided on the front of the display assembly 100 proximate observer 130. The LCD panel contains an electronically addressable liquid crystal light modulator 118 sandwiched between a pair of crossed dichroic polarizers 120.

LCD and other electronic displays preferably can withstand a wide range of operating temperatures. Displays of this type are typically portable and hence experience wide temperature extremes due to seasonal weather changes. To ensure temperature durability, these displays are typically tested in a thermal shock test, often being subjected to rapid temperature cycles from −35° C. to 85° C. In order for the optical quality of the display to withstand such testing, it is important for the enclosed films to remain substantially free from distortion. Distortion typically occurs when thermal expansion or contraction forces the film against internal bounding surfaces of the frame, thereby causing the film to buckle, or warp, in the z-direction normal to the display. To minimize warping of free-floating or loosely-secured films, there should be sufficient room, or clearance, within the frame to allow for differential thermal expansion. However, to maximize viewing area, the film should be cut to reduce clearance while maintaining room for thermal expansion.

Typically, a frame of an LCD or other such display is made of an injected molded plastic secured with a stainless steel housing. The thermal expansion characteristics of this construction is dominated by the stainless steel, thereby resulting in a frame with a very low, isotropic thermal expansion coefficient. The high thermal expansion of the light management films relative to the frame requires sufficient clearance between the internal bounding edges of the frame and the edges of the film to avoid contact with the frame. Because of the high temperature test cycle, this can be an exacting standard. Insufficient clearance can lead to film contact with the frame, introducing compressive stresses in the plane of the film causing the film to buckle in an effort to relieve those compressive stresses. Often when the films buckle at high temperatures, they remain in a distorted shape even after return to low (ambient) temperatures. This type of permanent distortion is referred to in the industry as warpage.

While the present invention is readily applicable for anisotropic optical films confined in frames in electronic display assemblies, the present invention can be generally applied to systems containing anisotropic films confined in frames, where the systems are expected to experience temperature variations.

In one embodiment, the film is cut through the z-direction at a reference temperature, (such as an ambient temperature or a preferred operating temperature), to form a shape in the x-y plane different from that of the frame, so that at a second reference temperature, such as an elevated temperature, there exists a solid body translation and solid body rotation of the film with respect to the frame in which the outer x-y edges of the film nearly conform to the internal bounding x-y edges of the frame. Exact conformity may be limited by tooling and cutting precision. By properly shaping an anisotropic film different from the frame, warping can be minimized while simultaneously reducing clearance.

In a subset of this embodiment, the frame is substantially rectangular overall, although protrusions or tabs having much smaller dimensions relative to the corresponding x- and y-dimensions of the overall frame may exist. Correspondingly, the film is substantially a parallelogram in the x-y plane at an initial reference temperature, although protrusions or tabs much smaller in their dimensions relative to the corresponding x- and y-dimensions of the film may exist. The film may be freely mounted or placed within the frame, or the film may be pinned or otherwise fixed in accordance with various other embodiments of the present invention.

In yet a further subset of this embodiment, the film is cut so that there exists an initial placement of the film within the frame that requires no rotation of one pair of parallel film edges with respect to one pair of parallel frame edges. This embodiment can be used to control the rotation of the principal film axes of expansion or solid body rotation of the film relative to the frame.

In a related embodiment, three reference temperatures are considered, namely a high temperature and a low temperature (as may be determined by a specific product requirements) as well as a working or ambient temperature at which the film is cut, shaped, processed, stored, or placed into the frame assembly.

In another embodiment, tabs or other protrusions added to the film and frame shapes are positioned to minimally constrain thermal expansion of the film. In a related embodiment, tabs are placed to control a fixed point on the film relative to the frame during the expansion. For example, the fixed point can be a point of zero relative translation to the frame during expansion. This embodiment can be used to control solid body translation of the film with respect to the frame.

In still another embodiment, slots of prescribed length and orientation may be made in the film, so that the film may be pinned or otherwise affixed to the frame, and so that minimal constraint on thermal expansion is achieved. These slots may be made in special tabs or protrusions on the film perimeter away from the main area of the film.

In still another embodiment the methods described herein are contained in an algorithm or a computer program. As a particular example of this embodiment, the various subroutines of a computer program that can be used according to the method of the present invention are disclosed in a Microfiche Appendix to the present specification. A computer program embodying the method of the present invention can also be used in an automated converting process where a user specifies the dimensions of a frame and the thermal expansion characteristics of a film material to be enclosed in a frame, and the computer calculates the size and shape of the film for a given film orientation. Further, the computer calculations can be relayed to a machine which automatically cuts the film accordingly to complete the automated converting process.

To better appreciate these and other various embodiments of the present invention, it is convenient to illustrate the thermal expansion of various anisotropic films cut according to the present invention and bounded by a frame. FIGS. 2 through 5 show anisotropic films confined to frames according to several aspects of the present invention.

Figure 2A:
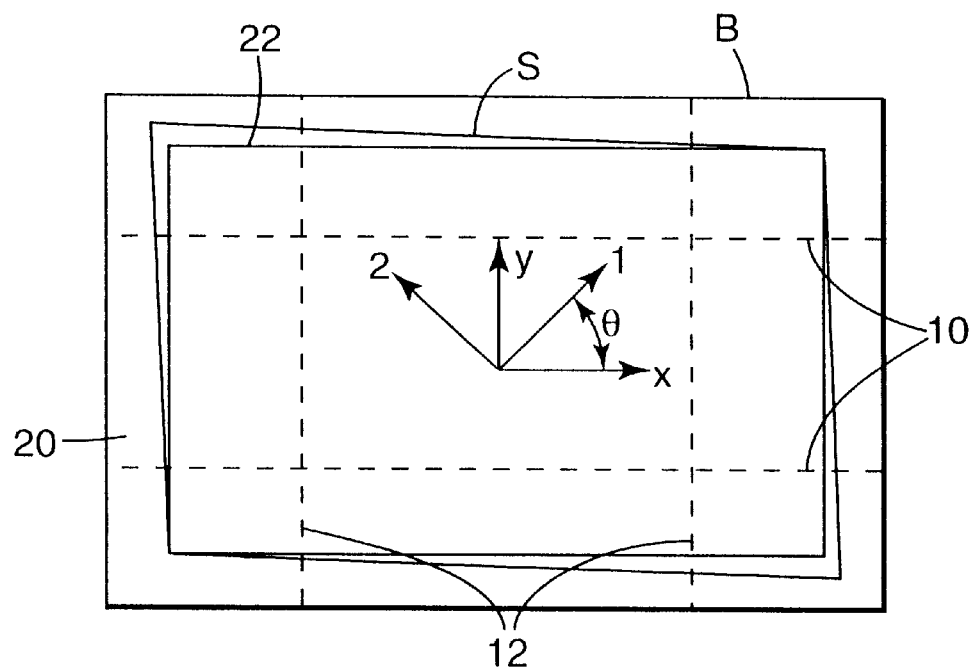
FIG. 2a is a schematic plan view of a frame bounding an anisotropic film of the present invention at a reference temperature.

FIG. 2a shows an anisotropic film S bounded by a flame having an internal bounding edge B at an ambient reference temperature. For sake of clarity, the frame is assumed to be rectangular with negligible thermal expansion characteristics, and the clearance between the film and the frame has been exaggerated. The film and frame lie in the x-y plane defined by axes x and y. For simplicity, the x-direction in the plane is aligned with the horizontal edges of the frame and the y-direction in the plane is aligned with the vertical edges of the frame. Film axes 1 and 2 defined the principal directions of thermal expansion for the film. The larger expansion coefficient lies along axis 1 and the smaller expansion coefficient lies along axis 2. The angle θ denotes the orientation of film axes 1 and 2 with respect to the orthogonal x- and y-directions of the x-y plane.

As described in detail below, the method of the present invention determines the maximum size and shape of film S at an ambient reference temperature given the thermal expansion characteristics of the film and the vertices of the internal bounding edge B of the frame. In FIG. 2a, film S is cut to the maximum shape, a parallelogram, given the rectangular frame. Note that at the ambient reference temperature, more film material lies along axis 2, the axis of lesser expansion, than along axis 1, the axis of greater expansion. Clearance area 20 is the area between the edges of film S and boundary B of the frame. For comparison, rectangle 22 represents the largest shape similar to the shape of frame boundary B which fits within the parallelogram of film S. Rectangle 22 is the film shape and size achieved using conventional trial and error film sizing methods. As seen in FIG. 2a, by shaping the film differently than the frame at the ambient reference temperature, the clearance area is reduced.

Figure 2B:
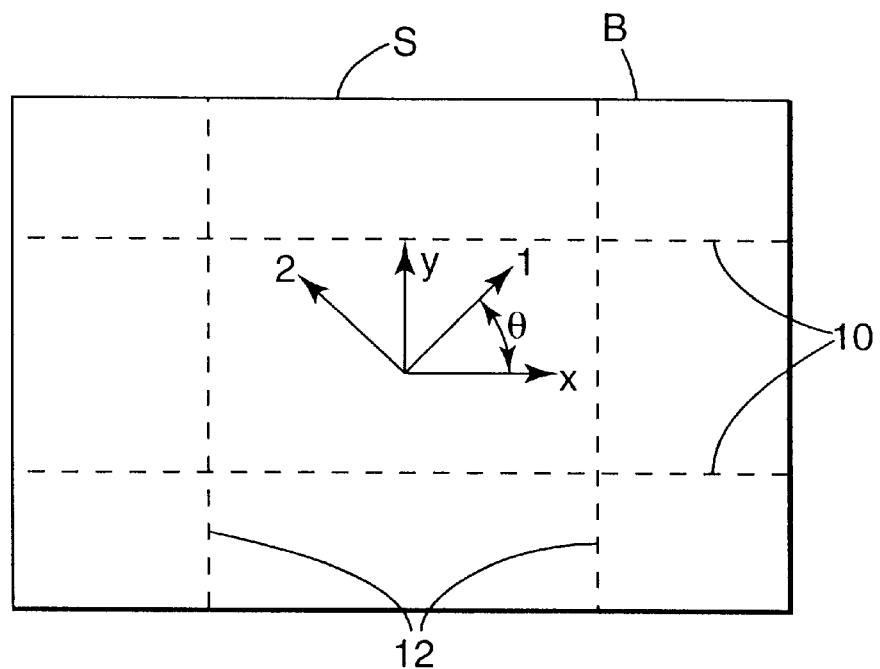
FIG. 2b is a schematic plan view of the frame and film of FIG. 2a at a higher reference temperature.

FIG. 2b shows the film of FIG. 2a after thermal expansion by heating to an elevated reference temperature. To illustrate the motion of film S after thermal expansion, two sets of parallel lines 10 and 12 are indicated, lines 10 being parallel to one set of film edges and lines 12 being parallel to the other set of film edges. At the elevated reference temperature, maximum-sized film S expands to completely fill frame boundary B. As can be seen, axes 1 and 2 remain in their respective positions relative to the x-y plane axes. However, lines 10 and 12 have been rotated and remain parallel to their respective parallel film edges.

Figure 3A:
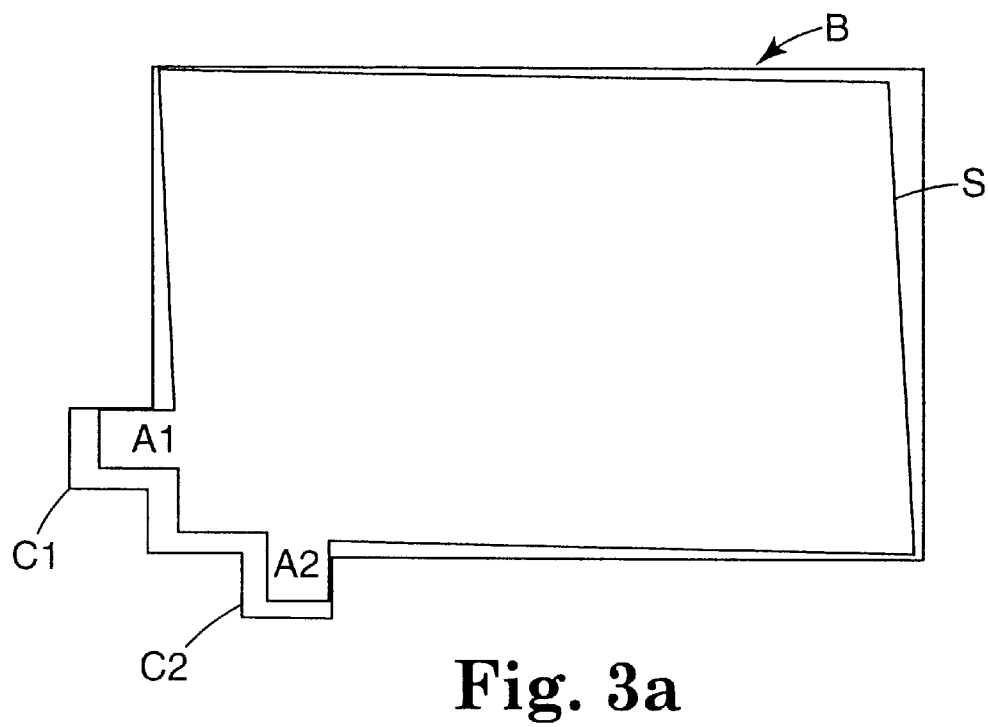
FIG. 3a is a schematic plan view of a frame having tab cavities bounding an anisotropic film having corresponding tabs according to the present invention.
Figure 3B:
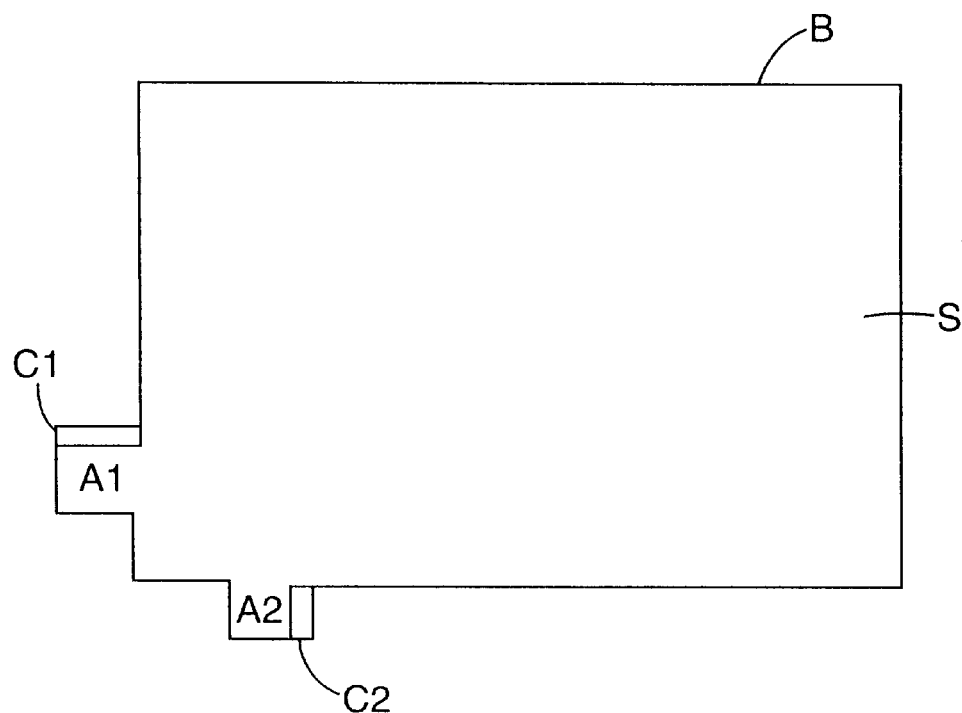
FIG. 3b is a schematic plan view of the frame and film of FIG. 3a after thermal expansion of the film.

FIG. 3a shows an anisotropic film S of the present invention bounded in a frame having internal boundary edge B. The frame of FIG. 3a is similar to that of FIGS. 2a and 2b. In addition, the frame of FIG. 3a has tab cavities C1 and C2 along two of its edges. The vertices defining these tab cavities are included in the set of vertices that define the internal boundary edge B of the frame. Film S is provided with tabs A1 and A2 that correspond to the tab cavities in the frame. Tabs A1 and A2 are trimmed to allow displacement of the tabs during thermal expansion. After thermal expansion due to heating to an elevated reference temperature, film S expands to fill most of the frame boundary B as shown in FIG. 3b. Note that tabs A1 and A2 are displaced in tab cavities C1 and C2 upon thermal expansion.

Figure 4A:
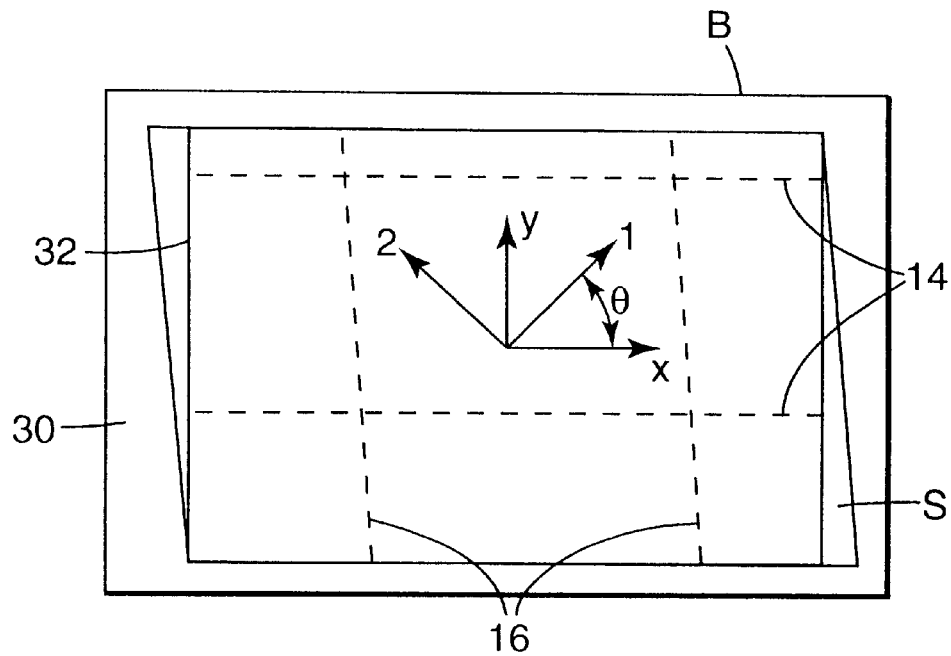
FIG. 4a is a schematic plan view of an anisotropic film oriented in a frame according to the present invention.
Figure 4B:
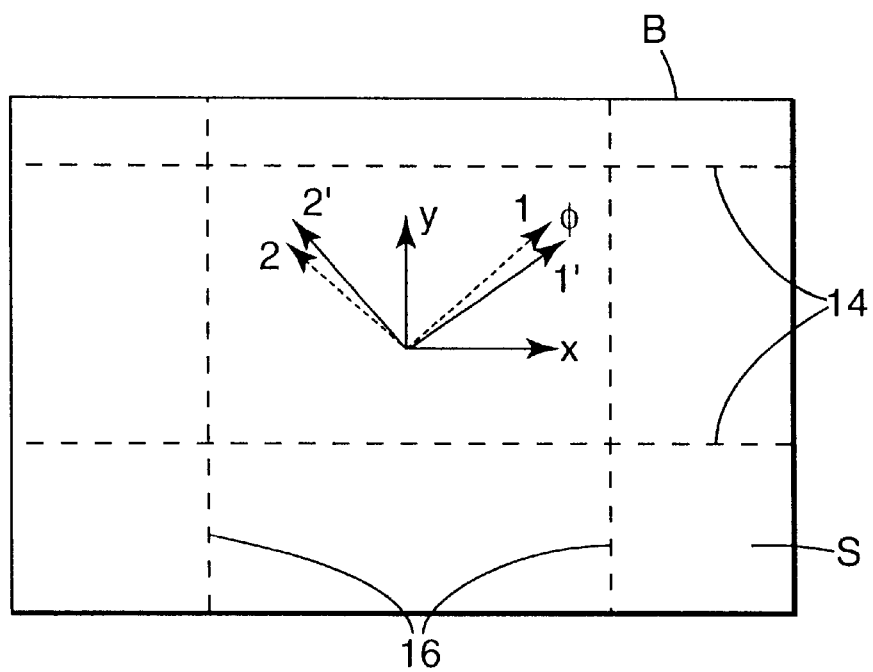
FIG. 4b is a schematic plan view of the film and frame of FIG. 4a after thermal expansion of the film in which the principal axes of expansion of the film have rotated.

FIGS. 4a and 4b show an anisotropic film S bounded in a frame B where the film orientation at the ambient reference temperature is chosen so that thermal expansion of the film requires no rotation of one pair of parallel film edges with respect to one pair of parallel frame edges. FIGS. 4a and 4b are similar to FIGS. 2a and 2b, except that film S in FIG. 4a is oriented so that the pair of film edges parallel to lines 14 are also parallel to the horizontal frame boundary edges at the ambient reference temperature. Thermal expansion results in both displacement of the film and rotation of axes 1 and 2 of thermal expansion of the film as shown in FIG. 4b. Rotation of the expansion axes through an angle φ results in the expansion axes lying along new directions 1' and 2'. Lines 14 remain parallel to the horizontal frame edges whereas lines 16 go through a rotation to become parallel to the vertical frame edges.

FIG. 4a also shows the maximum rectangle 32 for a film cut according to conventional methods. As can be seen, by shaping the film S as a parallelogram having non-right angles, the area of clearance 30 is reduced compared to conventional methods.

Figure 5A:
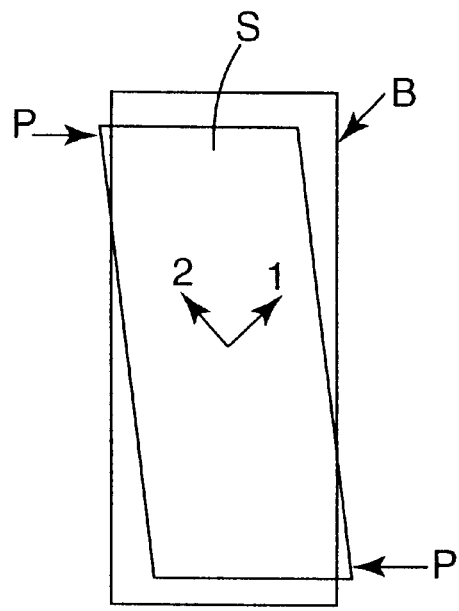
FIG. 5a is a schematic plan view of an anisotropic film cut to a maximum shape for a given frame according to the present invention in which the film cannot fit in the frame at an ambient reference temperature without rotation.
Figure 5B:
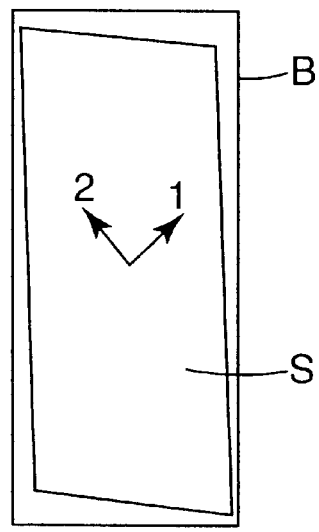
FIG. 5b is a schematic plan view of the film and frame of FIG. 5a where the film has been rotated to fit the frame at an ambient reference temperature.

FIGS. 5a and 5b show a frame having an elongated internal boundary edge B. For this frame, a film S having the maximum film size according to the present invention does not fit into the frame at the ambient reference temperature for all film orientations. FIG. 5a shows that for a film orientation having film edges parallel with the horizontal edges of the frame, portions P of the film do not fit into the frame. FIG. 5b shows that film S fits into frame boundary B for at least some orientation at the ambient reference temperature. For applications that require certain film orientations, portions of the film that would otherwise not fit into the frame at the ambient reference temperature can be trimmed to achieve the desired film orientation at all desired temperatures.

General Method of the Present Invention

An appreciation for the teachings of the present invention can be gained from a general understanding of the formulae used in determining the largest optimum size for an anisotropic film given the dimensions of the confining frame space. The description that follows offers a general framework. However, specific examples of problems that can be addressed using this general framework are also discussed. These examples are meant to illustrate the present invention and are not meant to limit the scope of the present invention or recited claims. Using the general description and specific examples below, one of ordinary skill will understand the full scope of the present invention. For purposes of discussion, the bounding frame and the bounded film or sheet have matrices or tensors of thermal expansion denoted by $\alpha_B$ and $\alpha_S$ respectively. In general, quantities or properties associated with the frame will be denoted by a subscript B and quantities or properties associated with the film will be denoted by a subscript S. The frame and film thermal expansion tensors can be described with respect to an arbitrary coordinate system. Because the present invention is primarily concerned with expansion in the x-y plane, a two dimensional representation can be used to describe expansion properties for the frame and film.

The linear thermal expansion coefficient, $\alpha$, is defined as:

$$\alpha = \frac{\partial l}{l \partial T} \qquad \text{A1}$$

For small length changes Equation A1 can be rearranged to give the final length of a sample, l, as a function of its initial length, $l_0$, and the change in temperature, $\Delta T$, that is:

$$l = (1 + \Delta T \alpha) l_0 \qquad \text{A2}$$

For an anisotropic film, the thermal expansion coefficient changes with direction in the plane of the film. To account for this anisotropy, Equation A2 can be rewritten in tensor form according to:

$$l = (I + \Delta T \alpha) \cdot l_0 = D \cdot l_0 \qquad \text{A3}$$

where $l_0$ and $l$ are vector quantities of the initial and final lengths, I is the identity tensor, and $\alpha$ is the thermal expansion tensor, a symmetric second order tensor. The quantity in parenthesis in Equation A3 is denoted as the expansion displacement ratio tensor, D. At the initial reference temperature, $\Delta T$ is zero and the expansion displacement ratio is the identity. For an isotropic film, Equation A3 readily reduces to Equation A2. By writing Equation A3 in terms of tensors, the change in size and shape a film undergoes due to thermal expansion is completely described. The assumption that $\alpha$ is a symmetric second order tensor can be verified by examination of the apparent angular dependence of the thermal expansion coefficient. A symmetric second order tensor can be expressed in canonical form:

$$\underline{\underline{\alpha}} = \begin{pmatrix} \alpha_1 & 0 \\ 0 & \alpha_2 \end{pmatrix} \qquad \text{A4}$$

where $\alpha_1$ and $\alpha_2$ are the principal values of thermal expansion (the maximum and minimum values) measured along the principal directions in the film plane.

The thermal expansion tensor, $\alpha$, can also be written in an arbitrary coordinate reference frame in which the first principal material axis is rotated by an angle $\theta$ from a first coordinate axis of the arbitrary reference frame. The generalized thermal expansion tensor, $\alpha^\theta$, is therefore:

$$\alpha^\theta = \Omega \cdot \alpha \cdot \Omega^t \qquad \text{A5}$$

where $\Omega$ is the coordinate transformation tensor for a rigid rotation given by:

$$\underline{\underline{\Omega}} = \begin{pmatrix} \cos\theta & -\sin\theta \\ \sin\theta & \cos\theta \end{pmatrix} \qquad \text{A6}$$

and where $\Omega^t$ is $\Omega$ transposed. The columns of Equation A6 may be interpreted as the eigenvectors, or principal directions, of thermal expansion of the material in the arbitrary reference frame. Combining Equations A4, A5, and A6 yields the thermal expansion tensor:

$$\underline{\underline{\alpha}}^\theta = \begin{pmatrix} \alpha_1\cos^2\theta + \alpha_2\sin^2\theta & (\alpha_1 - \alpha_2)\cos\theta\sin\theta \\ (\alpha_1 - \alpha_2)\cos\theta\sin\theta & \alpha_2\cos^2\theta + \alpha_1\sin^2\theta \end{pmatrix} \qquad \text{A7}$$

Thus, Equation A7 can be used to describe $\alpha_B$ and $\alpha_S$ with respect to an arbitrary reference frame. Taken together, Equations A7 and A3 can be used to determine the expansion displacement ratio tensors for the frame and the film.

The film and the internal boundary edge of the frame may be considered polygons of n sides described by their respective sets of n vertices $\{R_{1,S} \ldots R_{n,S}\}$ and $\{R_{1,B} \ldots R_{n,B}\}$. Typically, the film and frame will have the same number of sides, and thus the same number of vertices. However, the film or frame may have features such as protrusions or indentions that do not correspond to similar features in the other. General shapes are considered in the present invention as limits of polygons. By shape, it is understood that the relative lengths of the n sides as well as the angles between them are included. A similarly-shaped polygon of different size has the same number of sides (and thus same number of vertices) with the same relative size and the same angles between them. A particularly useful polygon is a parallelogram consisting of four vertices because this shape describes the typical main shape of an electronic display panel.

One aspect of a method of the present invention includes considering the relative positions of the sets of vertices for the frame and the film at an ambient reference temperature (such as a temperature at which the film is cut or shaped or the preferred operating or storage temperature of the film), and an elevated reference temperature higher than the ambient reference temperature (such as the highest operating temperature or the upper temperature extreme of a thermal cycling test). In certain embodiments of the method a third temperature reference condition, even lower than the ambient condition, can be considered. This third condition can be useful, for example, in a case where one principal expansion coefficient of the frame is higher than that of the film. Thermal contraction upon cooling may then cause compression and possibly warping, if this third reference state is not considered.

A general transformation rule for the displacement of the sets of vertices of the internal frame boundary and the film with respect to an arbitrary coordinate system can be written. The present invention exploits this general transformation and, in some preferred embodiments, determines special conditions that optimize the design of the frame and film assembly. Defining $R^+$ as the position in a chosen elevated temperature reference state, also called the plus (+) state, and $R^0$ as the same material position in an ambient temperature state, also called the zero (0) state, then the general transformation rule is:

$$R^+ = Q^+ \cdot D^+ \cdot (R^0 - 0^0) + + 0^0 + Tr^+ \qquad \text{A8}$$

where $D^+$ is the expansion displacement ratio of the film. The expansion displacement ratio is given by Equation A3 where $\Delta T$ is the difference in temperature from the plus (+) reference state and the zero (0) reference state, and $\alpha^\theta$ is given by Equation A7 where $\theta$ is the angle between the principal axes of thermal expansion of the material and the arbitrary coordinate system of the zero (0) reference state. $Q^+$ is the solid body rotation matrix. The solid body rotation, $Q^+$, is similar in form to $\Omega$ of Equation A6, but with a different angular argument, $\phi$, the angle of rotation of the material axes from the their orientation in the zero (0) reference state to their orientation in the plus (+) reference state. $O^0$ is the center of the solid body rotation as well as of the expansion as chosen for calculation purposes, and $Tr^+$ is the solid body translation determined by the motion of the center $O^0$ to $O^+$. Thus, the sum of $O^0$ and $Tr^+$ equals $O^+$.

The quantities are written with respect to a single frame of reference such as the frame of reference of the bounding frame in the zero (0) reference state. Equation A8 is general in that the material can be the film or the frame. In some cases, it may be convenient to take $Q_B$, $Tr_B$ and $O_B$ from interactions of the frame with a larger assembly. Without losing generality, the origin of the arbitrary reference frame can be fixed to coincide with the centroid of the polygon which defines the overall shape of the frame, and the arbitrary reference frame can be allowed to co-rotate and translate along with the frame. In such a coordinate system, $O_B$ and $Tr_B$ are zero vectors and $Q_B$ is the identity matrix, thereby simplifying Equation A8. Fixing $O_B$ also fixes the frame of reference for thermal expansion since this point remains fixed in that reference frame. If the frame is anisotropic, even in this frame of reference the frame may still alter shape if the principal material axes of the frame do not coincide with sides of the frame. In the case of the film, when the film is free to rotate, translate and expand in the film plane, there is flexibility in the values of $Q_S$, $O_S$, and $Tr_S$. An aspect of the method of the present invention involves exploiting theses various values to optimize the film shape with respect to the frame design by selecting a film shape different from the frame shape which reduces clearance while also minimizing warping. This includes optimizing the location and clearance for tabs or slots in the main shape of the film and/or the frame.

By substituting parametric vector representations of lines for the position vectors into Equation A8, the behavior of the sides of the frame or the edges of the film can be discerned. It is observed that parallel lines, sides or edges (subsequently included as lines) remain parallel under expansion as long as warping does not occur. Lines parallel to the principal material directions remain parallel lines when moving from one temperature reference condition to another. Lines not parallel to a principal material direction but parallel to each other in a first reference state remain parallel in a second reference state; however, their directions are tilted in the second reference state relative to their direction in the first reference state. Also, lines intersecting O, the center of rotation, continue to intersect O when Tr, the solid body translation, is zero. These observations can be exploited for optimal design.

In many applications, for example electronic displays, it may be desirable to include a polarizing film oriented with a transmission axis that is non-coincident with a side or edge of the display. Since the transmission axis often coincides with the material orientation axis, and thus a principal axis of thermal expansion, the thermal expansion axes are generally not parallel to the display edges. It follows that the edges of a polarizing film cut to orient the transmission axis off angle from a side of the display will probably not coincide with the principal directions of thermal expansion.

Such a film cut as a rectangle would thermally expand into a parallelogram. A rectangular frame may likewise expand into another parallelogram, probably of very different relative angles. If the film has much higher in-plane thermal expansion coefficients than the frame, the frame shape change and expansion may be relatively minor, and thus the frame can often be treated as a rectangle throughout the range of reference temperatures.

In a complementary aspect of the method of the present invention, it is recognized that it may be desirable for the film to fill the frame at a specific design temperature. This preferred condition describes the shape of the film of maximum size allowing for minimum clearances. This concept results in the approximate working requirement that the set of internal frame boundary vertices at the plus (+) reference state substantially match the set of film vertices at the plus (+) reference state, to wit:

$$\{R^+_{1,S} \ldots R^+_{n,S}\} = \{R^+_{1,B} \ldots R^+_{n,B}\} \qquad \text{A9}$$

Moreover, this aspect of the invention results in a relationship between the sets of frame and film vertex positions in another reference state, for example the zero (0) state. Using Equations A8 and A9, the following relationship can be derived:

$$R_s^0 = O_S^0 + (D_s^+)^{-1} \cdot (Q_s^+)^{-1} [O_B^0 - O_S^0 + Tr_B^+ - Tr_S^+] + (D_s^+)^{-1} \cdot (Q_s^+)^{-1} \cdot Q_B^+ \cdot D_B^+ \cdot [R_B^0 - O_B^0] \qquad \text{A10(a)}$$

or $$R_s^0 = O_S^0 + (D_s^+)^{-1} \cdot (Q_s^+)^{-1} \cdot [-O_S^0 - Tr_S^+] + (D_s^+)^{-1} \cdot (Q_s^+)^{-1} \cdot D_B^+ \cdot R_B^0 \qquad \text{A10(b)}$$

Equation A10(a) is totally general whereas Equation A10(b) eliminates the frame rotation, center of rotation and translation according to the previous discussion. Equation A10(a) is useful for integrating the results of the method of the present invention into a larger article or construction in which the frame and film are a sub-component so that the reference frame cannot be chosen arbitrarily.

Equation A10(b) provides a framework for calculating the maximum film shape and size for minimum clearances. In many embodiments, the film has a certain degree of free play in rotation and translation related to the clearances allowed. The preferred procedure for obtaining a film shape without regard to orientation or translation is to set $Q_S$ equal to the identity, and to set $O_S$ and $Tr_S$ to zero. According to the method of the present invention, Equation A10(b) may then be used to calculate the film shape in the zero (0) state. In the particular case in which both of the principal coefficients of thermal expansion of the frame are less than both of the principal coefficients of thermal expansion of the film, the set of film vertices at the zero (0) reference state according to this calculation determine the maximum film size and shape for minimum clearance without compression and possible warping during thermal expansion under operating conditions inside a frame. An analogous procedure apparent to the ordinarily skilled artisan can be followed for reference states at lower temperatures than the zero (0) reference state.

More generally, the choice of $O_S^0$ and $Tr^+$ may be related to the particulars of the design. If there are no specific constraints on the film, it is convenient to choose $O_S^0$ to coincide with the centroid of the film. Because the centroids of the frame and the film can be derived from their respective sets of vertices, Equation A9 also implies that the centroids coincide in the plus (+) reference state (i.e. $O_S^+ = O_B^+$). Using the frame of reference of the frame with $O_B$ at the origin, it follows that $Tr_S^+ = -O_S^0$. If the film is constrained at a particular point by a pin or an object that either allows or fixes rotation while fixing translation, then it is appropriate to choose the position of the fixed point as $0_S^0$. In this case, if the pin is attached to the frame, then it expands with the frame, and the position of $O_S^+$, and hence $Tr_S^+$, follows directly according to $Tr_S = (D_B^+ - I) \cdot O_S^0$. If the pin is attached to a component in the assembly other than the frame, then the relative motion of this component with respect to the frame is also added to $Tr_S$.

In some embodiments, the frame may possess one principal coefficient of thermal expansion which is smaller than one of the principal coefficients of thermal expansion of the film, while the other principal coefficient of thermal expansion of the frame is larger than one of the principal coefficients of thermal expansion of the film. Under such a material combination, cooling of the frame to a third, lower reference temperature (such as a lowest desired temperature for the design or the low temperature extreme of a thermal cycling test) may result in compression of the film by thermal contraction of the frame against the film. In this combination, the ideas set forth in Equation A10(a) and (b) can be applied to this third reference temperature as well by replacing the plus (+) state quantities with minus (−) state quantities. This procedure results in two sets of n-polygon vertices for the film at the zero (0) reference state. The film of minimum clearance for operation between the high and low temperature reference states is found by choosing the maximum polygon included by both sets of vertices. In many instances, this procedure may lead to a film that does not entirely fill the frame at either temperature extreme.

In still other embodiments, the amount of solid body rotation and/or translation of the film are fixed. This can occur when the film is positioned by a positioning system (such as tabs or pins), as described below. In these cases, the shape of minimum clearance might not fit in the frame at the zero or other reference state even though the film otherwise could if such translations and rotations were allowed. In these cases, trimming in analogy to the previous paragraph is required. That is, the maximum polygon satisfying all conditions is found and the film is cut accordingly.

In display applications, the viewing area is typically smaller than the film in a certain reference state such as the ambient temperature reference state because of the need for clearances and the play that those clearances allow. The play is typically the sum of the clearances. In the conventional methods of the art, the viewing area is shaped similarly to both the frame and film (therefore usually as a rectangle), the maximum dimensions of the viewing area being no more than the dimensions of the film minus the play needed for each of the x- and y-directions. Rotational play reduces the viewing area still further. As the film is tipped or rotated, gapping in one direction between the film and frame by an amount more than the amount of play along that direction can occur across part of the viewing area due to cross-play with the other direction.

Figure 6A:
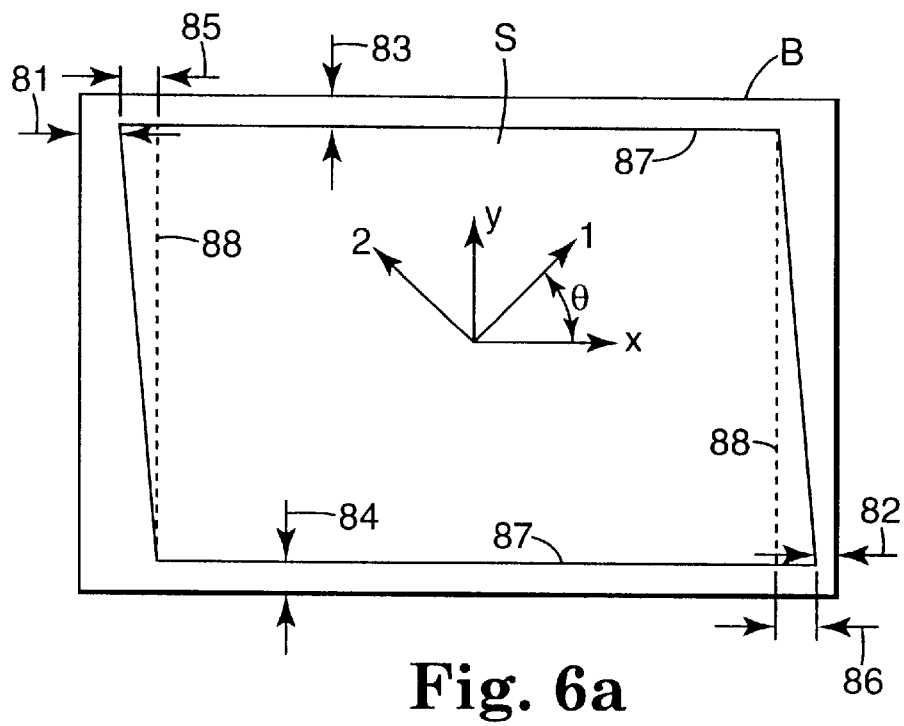
FIG. 6a is a schematic plan view of an anisotropic film cut to a maximum shape for a given frame according to the present invention.

The present invention reduces play and thus increases viewing area by either cutting a film to a size that reduces clearance, or by reducing the play through a film positioning system. In any case, the film has a size and shape that lies between the frame and the viewing area. By way of example, in the case of a parallelogram film of the present invention, a maximum rectangular viewing area is the maximum rectangle inscribed in the film parallelogram if there were no play, such as by using a film positioning system. The actual maximum viewing area is less than this due to the residual play. FIG. 6a compares the x- and y-play for a given frame B between the film S cut according to the conventional art and to the angle cut embodiment according to the present invention. The inscribed rectangle is defined by horizontal sides 87, which coincide with the horizontal edges of film S, and dotted vertical lines 88. The horizontal play for film S is the sum of the left clearance width 81 and the right clearance width 82. Due to rotational cross-play, the actual x-play is slightly more than the sum of clearance widths 81 and 82. The horizontal play of the inscribed rectangle is the sum of the left and right clearances 81 and 82 plus the additional clearances 85 and 86. Again, the clearances are slightly more due to rotational cross-play. The vertical play in both cases is the sum of the vertical clearances 83 and 84 plus the rotational cross-play.

Figure 6B:
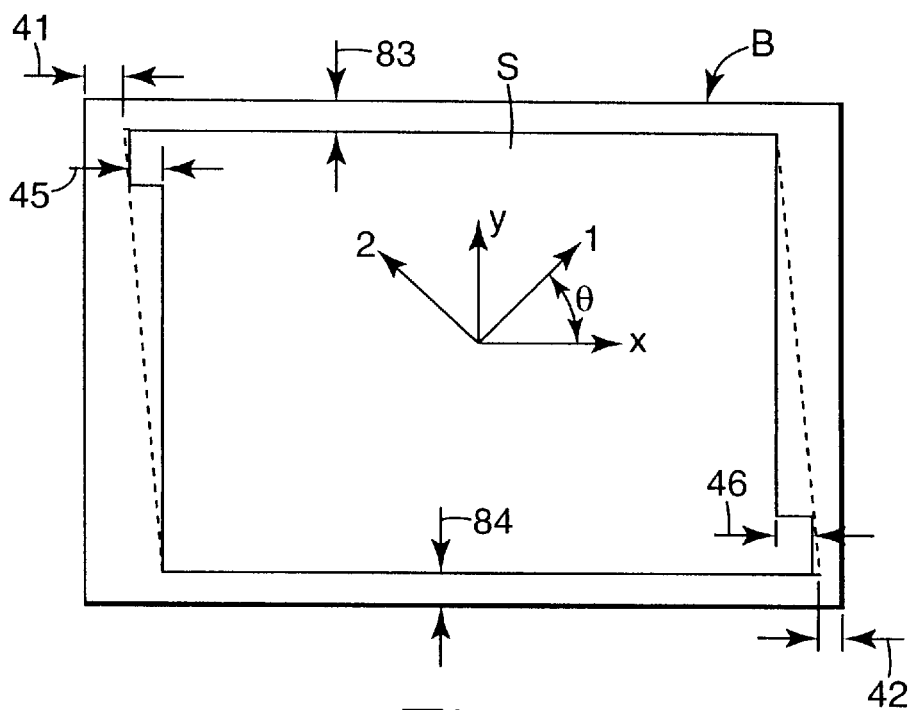
FIG. 6b is a schematic plan view of the anisotropic film of FIG. 6a having edges trimmed according to the present invention.

The reduction in play for the film S can be significant. For instance, the removed clearances 85 and 86 may each range, for example, from 0.1 to 1.0 mm or more for a film approximately 25 cm long. In some cases, it may be useful to trim the overall shape of the film to some intermediate size and shape between the inscribed rectangle and the parallelogram for minimum clearance. In such cases, the residual portion of the parallelogram outside the inscribed rectangle may continue to provide utility by minimizing play or otherwise assisting in the positioning within the frame. In FIG. 6b, the sum of the clearances 41 and 42, and the removed clearances 45 and 46 are still equal to the sum of 81, 82, 85 and 86. In FIG. 6b, the horizontal play is reduced by the sum of 45 and 46 rather than the larger sum of 85 and 86.

In some applications, it may be preferred that the material axes of the film retain their directionality during temperature changes. This can be done by setting $Q_S$ equal to the identity matrix. This may be preferred in applications where even very small changes in a material orientation (those, for instance, less than 0.5 degrees), are detrimental to performance. For example, displays intended to perform over a wide range of operating temperatures may be very sensitive to small changes in orientation of polarizer films. In other applications, very small material rotations can be tolerated, and indeed might be preferred to allow for small rotations in order to optimize other design specifications. For example, it may be preferred to maintain the orientation of one film material edge, or one series of parallel lines propagating through the film in-plane, or one film edge parallel to a frame edge. This could be useful in a display application in which rotations can be tolerated at higher storage temperatures. Such rotations would not necessarily manifest at operating temperatures. In still other display applications, such as brightness enhancement, small changes in the orientation of the polarizer may be tolerated even at operating temperatures. As another example, it may be preferred during film post-processing to be able to cut the approximate shape of the film and then re-trim one set of parallel sides of a parallelogram film. Additionally, such steps may be preferred to optimize the location and minimize the clearances around tabs or other positioning features for the film in the frame. When a film edge is fixed, the present invention teaches an angle cut to allow for solid body rotation of the film.

A particularly useful angle cut with solid body rotation embodiment is that of a parallelogram-shaped film made of an anisotropically expanding material and bounded by a rectangular frame made up of an approximately isotropically expanding material. The shape of the film at the zero (0) reference state may be designed to minimize the clearance of the film at the plus (+) reference state while allowing one set of film edges to remain parallel to one set of frame sides. In this embodiment, the rotation tensor $Q_S$ is chosen according to the criterion of maintained orientation of a film edge. This may be found using Equations A10(a) and (b) by operating on the parametric vector representation of a line that retains the same direction in the zero (0) and plus (+) reference states. This is done by replacing $R_S^0$ and $R_B^0$ with equations of lines of initially equal slope and solving for the angular argument of $Q_S^+$ given $Q_B^+$ to maintain this equality. To further illustrate the concept, the film and frame edges initially parallel and orientated along the horizontal can be chosen. Moreover, the case where the difference between $D_B^+$ and the identity is much smaller than the difference between $D_S^+$ and the identity can be considered. Using these conditions, it follows that the solid body rotation angle $\phi$ in $Q_S^+$ is determined according to the criterion:

$$-\tan(\phi) = \frac{\Delta T(\alpha_1 - \alpha_2)\cos\theta\sin\theta}{1 + \Delta T\alpha_1\cos^2\theta + \Delta T\alpha_2\sin^2\theta} \qquad \text{A11}$$

The ordinarily skilled artisan will appreciate that the angle $\phi$ can be similarly determined for other desirable conditions. In accordance with the present invention, the film can be shaped by using the choice of $Q_S^+$ from Equation A11 and using Equation A10.

It is noteworthy that a rectangular film may be re-trimmed along one set of parallel sides, such as the vertical edges in the case described above, according to the present method to form a parallelogram at the zero (0) reference state. The other set of film sides may be positioned to remain parallel to the frame during the expansion process. In the particular case described by Equation A11, the substantially vertical edges of the trimmed film form an angle with the vertical axis, the angle possessing a magnitude approximately twice the magnitude of the solid rotation angle $\phi$. Alternatively, the film may be allowed to slip about at temperatures below the elevated reference temperature due to existing clearances while the shape of the film determines a self-correcting rotation as the film expands into the frame until the film and frame shapes approximately coincide at the elevated reference temperature. In this alternative, the rotation $Q_S$ is fixed only in the plus (+) reference state.

In another embodiment, it is useful to position the film so that the centroid of the overall shape of the frame and the overall shape of the film coincide in the zero (0) state. In this embodiment, $Q_S$ and $Tr^+_S$ are zero in the frame reference frame. It is believed that such a centering of the film and frame may reduce the propensity of the film to warp due to random friction or sticking of the film against adjacent display components. The minimal clearance shape of the film relies in part on the concepts of free expansion and uniform temperature. In many applications, the film is sandwiched between other components. The film may tend to lay on one of these bounding components in the thickness direction. If the clearances in the thickness direction become too small (for example from bowing of a light guide component), or if frictional forces are too large (due to local heating, for instance), then free expansion may be hindered. By centering the film, the mean square path from the fixed center point to a possible sticking point can be minimized. In other embodiments, it may be desirable to fix a place in the film near the point where maximum friction is anticipated, such as near the point of maximum bowing of an adjacent component or near the hottest portion in the x-y plane of the assembly. In some of instances, no rotation may be desired, or friction may prevent it, and $Q_S$ may be set to the identity for design purposes.

A preferred embodiment includes the combination of the angle cut with solid body rotation and a fixed point of the film. A particularly preferred embodiment fixes this point as the centroid of the film coincident with the centroid of the frame. Equation A10(b) simplifies under these conditions to:

$$R_s^0 = (Q_s^+ \cdot D_s^+)^{-1} \cdot D_B^+ \cdot R_B^0 \qquad \text{A12}$$

It should also be noted that additional engineering tolerances may be added to account for tooling errors and the like. For example, an additional scalar factor, $\epsilon$, may be introduced as a factor on the right-hand side of Equation A12. This factor may be about or less than unity, thereby resulting in a film cut slightly smaller. Additional tolerance schemes may be used. For example, variations in film or other properties may be included by calculating the maximum shape under the various combinations of thermal expansions or other quantities varying by plus or minus a given deviation. The optimal shape would then be the intersecting set of vertices for all these conditions, in analogy to the plus (+) and minus (−) reference states embodiment described previously. For a film approximately 25 cm long, additional tolerances of a few to several hundredths of a mm are typical. These extra tolerances are still much smaller than the amount of reduced play achieved with the present invention. Such additional engineering tolerance considerations are also applicable to the other embodiments described herein. It should also be noted that the constraint on the maximum film size can be slightly relaxed in theory due to a non-zero critical compressive load prior to buckling. This is difficult to estimate in practice but is considered within the scope of the invention.

In various embodiments, the frame might possess protrusions or tabs at various fixed locations on the edges of the film. These tabs can be considered as polygons decorating the main shape of the film, each tab having its own defining set of vertices. The tabs are usually very small relative to the size of the frame. Appropriately-corresponding positions for the set of vertices of the film including tabs may be calculated according to the method already described, using the same choices for Q, O and Tr as the main shape. From the standpoint of reducing clearances, in certain embodiments certain aspects of the size and shape of the tabs may be less critical than for the main shape of the film. For example, the portions of the tabs near the tab vertices positioned away from the main edges of the film can be trimmed (such as by cutting the tab corners), while leaving the positions of the interior tab corner vertices at the edges of the main shape as prescribed by a method of the present invention. In this way, the clearances at the tab/main film edge corners remain minimal.

In certain embodiments, the tabs may be used as a positioning system for the film. When tabs are used, there might still be some room for solid body film translation to fill the frame at the plus (+) reference state. By choosing the desired final translation, $Tr_S$, the present method determines the appropriate trimming of the tabs. For example, it may be preferred to have zero translation of the film centroid and thus preferred to trim the tabs accordingly.

In other embodiments, tabs can be placed on the frame as a positioning system for specific optimal placement of the film such as minimizing motion of the centroid of the film during thermal expansion or contraction. Such a positioning system might have applications in display technology in which a freely sliding film when vertically tipped tends to sink to the bottom of the frame under the action of gravity, or vice versa when tipped upside down. The effective clearance and loss in viewing area due to a free sliding system without using positioning tabs can be about twice that for systems where the film center is vertically fixed. The same holds for displays where horizontal position fixing is desired.

In general, optimum tab placement designs for minimum shifting (i.e. maximum position fixing), require minimum clearances between the film tabs and frame along a direction approximately aligned with the film edge on which the tab resides. The tabs thus may fix film slippage along this film edge direction. For example, in the case of a rectangular frame, tabs along the vertical edges can minimize vertical slippage, while tabs along the horizontal edges can minimize horizontal slippage. In practice, the effectiveness of the positioning system may also depend upon mechanical considerations such as the stiffness of the film (especially at the tabs), the weight of the film or the impulse applied in a shaking motion, the size of the film, the size of the tab and how tabs are mounted or supported on the film, and other such considerations. To minimize the clearances at these positioning tabs, ideal locations along certain edges of the n-polygon of the film may exist for which the relative motion of the film at that location is zero along the frame edge direction with respect to the frame throughout the expansion process. At this point on the film edge, all film motion during expansion is directed towards the frame along a line perpendicular to the frame edge and intersecting this film point. At the plus (+) reference state, the frame and film position along this intersecting line coincide. A special feature of such a positioning system is that the tab clearances provided along the edge direction is mostly a function of the width of the tab along this direction rather than a larger clearance related to the displacement of the part as a whole along this edge.

By way of example, the details of tab design are provided below in a particularly preferred embodiment of an anisotropic film cut into a parallelogram (that is, an angle cut with solid body rotation and no relative translation of the film centroid), confined inside a rectangular frame of negligible relative thermal expansion. The case is chosen in which the horizontal film and frame edges are to remain parallel throughout the expansion, and in which the centroids of the film and frame are always nearly coincident throughout the expansion. According to the methodology previously described, it follows that the optimum vertical tab placement in this case is along the horizontal centerline passing through the coincident film and frame centroid. In a relaxed version of this case, horizontal sliding may be allowed by merely demanding that the film centroid lie on the horizontal centerline but not necessarily at the frame centroid. In either case, the film must be trimmed along the edge direction (that is, along the vertical) inside the frame tab cavity to allow for horizontal thermal expansion at this point. This in turn results in a certain amount of horizontal slippage or play which diminishes as thermal expansion increases.

The optimum position for tabs along the horizontal edges is somewhat more complicated in this particular embodiment. Using the same criterion and defining the arbitrary coordinate frame with the origin at the centroid of the frame and the axes parallel to the frame's edges the optimum tab position is approximated to first order of the difference in the principal coefficients of thermal expansion of the film, $(\alpha_1 - \alpha_2)$, as:

$$x = \frac{-y_o (2\cos\theta \sin\theta)(\alpha_1 - \alpha_2)}{\alpha_1 \cos^2\theta + \alpha_2 \sin^2\theta} \quad \text{A13}$$

where x is the horizontal coordinate of the optimum tab center along the horizontal edge and $y_o$ is the vertical component of the horizontal film edge at the zero (0) reference state. A rather striking result is that the optimum position to a first order approximation is independent of temperature and is located significantly away from the vertical centerline. This is a result of the horizontal displacement of the film edge due to the solid body rotation of the main shape of the film during expansion canceling the displacement of the film edge due to this expansion at this particular film edge point. It should also be noted that the position is a strong function of the anisotropy of the film, coinciding with the vertical center line at isotropy. If the film is sufficiently anisotropic, and the material axes are sufficiently tilted with respect to the frame sides, then it can also be seen that there exist assemblies narrow enough in the horizontal that no optimal tab design can be found according to this criterion. In such a case, the best alternative is a tab at the tip of the horizontal edge nearest the optimum position. In any case, the film tab must again be trimmed inside the frame tab cavity to provide sufficient clearance for vertical expansion as well as a little horizontal displacement which scales with the length of the tab in the vertical direction. The clearance in the horizontal cut along the vertical edges of the tab again scale only with the size of the tab and not the size of the film. By combining a system of horizontal and vertical tabs, a means for minimizing the horizontal and vertical slippage may be obtained. In the case of an electronic display, minimizing slippage also maximizes the potential viewing area.

A positioning system may also include a slot cut into the tab through which a pin, slot or other keying device is inserted. When combined with the concept of optimum tab placements, additional flexibility in positioning control is obtained. For instance, in many applications, tabs along the horizontal edges may not be allowed due to the space requirements of the larger system or optimal horizontal tab placements may not exist due to part and material expansion aspect ratios. For example, in the previous embodiment, tabs along the vertical edge may be used not only to minimize vertical slippage but also horizontal slippage. A pin may be inserted deep within the frame tab cavity through tabs on the horizontal center line on either vertical edge of the film. Slots directed from the pins toward the main shape of the film may be made in the film to accommodate the expansion of the film from the film centroid towards the pins. Such pins should have minimum clearance from the frame slot cavity ends farthest from the film centroid either in the minus (−) reference state (preventing possible tearing and slitting of the film by the film under tension), or in the zero (0) reference state or other desired state (such as operating temperature) if the film can manage some thermal tension without failure. With two opposing tabs having slots and corresponding pins, a condition of minimum horizontal play and slippage may be achieved. As the temperature increases, the available play increases from the decreasing slot constraint. However, the horizontal slippage and play also decrease due to reduced clearances between the main film shape and main frame shape which decrease with expansion. Thus, the condition of maximum play and slippage exists at some intermediate temperature between the minus (−) and plus (+) reference states. If the minus reference state is sufficiently lower in temperature than the operating temperature or zero (0) reference state, and if the plus (+) state is sufficiently higher, then a positioning system using horizontal tabs may be preferred.

A pin and slot system for tabs that are not optimally placed requires slots with larger clearances. The required clearances for optimal and non-optimal tabs again can be found in the general case using the general method of the present invention. The slots and keying devices (such as pins) are described by their respective sets of vertices (or reasonable approximations thereof), and the positions of the slots and keying devices are calculated in the various reference conditions of interest.

It should also be noted that tabs can be used for other purposes. For example, tabs can be used as an aid to assembly by identifying a particular side of the film. Additional such tabs, not part of a positioning system, may be placed as desired with generous clearances cut as calculated. Alternatively, various tab functions may be combined with optimal tab placement and/or with a slot and key positioning system.

The method of the present invention may also be applied to systems in which other forms of differential expansion occurs between the frame and film. For example, many films undergo hygroscopic expansion due to water absorption with increasing relative humidity. The total expansion displacement ratio tensor may then include an added tensor quantity involving the anisotropic coefficients of hygroscopic expansion and changes in relative humidity with reference state in direct analogy to the thermal expansion coefficients and changes in temperature.

Finally it should be noted that many polymeric films are known to shrink over time. The effects of shrinkage on the design of clearances can also be incorporated by subtracting a shrinkage matrix or tensor from the thermal expansion tensor to define a shrinkage modified expansion displacement ratio matrix or tensor. By convention, a positive shrinkage is a contraction. The shrinkage tensor is also symmetric and follows second order tensor behavior. However, the principal directions of shrinkage often do not coincide with the principal directions of thermal expansion. In addition, the components are functions of the time/temperature history. Thus, the shrinkage modified expansion displacement ratio tensor is symmetric but no longer has principal directions coincident with the thermal expansion tensor. Shrinkage may require adjustments in the design of tabs (e.g., the clearances of slots in the minus (−) reference condition). Because the change in the realized shrinkage strongly decreases over time, appropriate pre-shrinking of films used in the assemblies described here may also be desirable.

EXAMPLES

In the following examples, assemblies having a film bounded by a frame were tested under thermal cycling conditions. In each test, the film was placed within the bounding edges of a frame, and the film-frame assembly was alternately placed in a refrigerator at 4° C. for 1 hour and an oven at 85 ° C. for 1 hour. The thermal cycle was repeated for a total of three cycles.

In the examples below where film vertices where calculated according to the present invention, the results of the calculation are reported to the third decimal place and the films were cut accordingly. However, because of engineering tolerances, either built-in or otherwise, the actual dimensions of the films cut according to the calculated vertices may not have exactly matched the calculated vertices.

The frames used were:

Frame A

A square frame constructed by placing strips of a rigid plastic sheet (4.0 mils thick biaxed polyethylene terephthalate (PET)) in a square shape between two panes of 1/16 inch thick etched glass. The strips were positioned to form a square inner housing having sides 8.25 inches long. The weight of the glass panes securely fixed the position of this inner housing. The z-spacing, or clearance in the z-direction normal to the film plane, was controlled by stacking a layer of the material to be tested with a layer of PET.

Frame B

A commercial LCD display. This LCD display had a rectangular frame to house light management films. It had dimensions of 9.985 inches in the horizontal direction and 7.531 inches in the vertical direction. Additionally, two small cavities for tabs were present along each vertical edge of the frame. The tab cavity along the right vertical edge had dimensions of 0.075 inches in the horizontal direction by 0.191 inches in the vertical direction and was positioned with its lower edge 5.692 inches from the lower horizontal edge of the frame. The tab cavity along the left vertical edge had dimensions of 0.130 inches in the horizontal direction by 0.265 inches in the vertical direction and was positioned with its lower edge 5.618 inches from the lower horizontal edge of the frame. A flange covered the frame and separated the film from the LCD panel of the LCD display. The LCD panel of the LCD display contains the liquid crystal elements housed in glass, laminated to a dichroic polarizer. The flange extended into the inner boundary of the frame by 0.118 inches along all edges of the frame. When fully assembled, the frame cavity housing the light management films was bounded in the z-direction from above by the LCD panel and below by a sheet of commercial plain paper copier film of thickness 4.0 mils.

The films used were from the following materials:

Material A

A sample of reflective polarizing film as sold by Minnesota Mining and Manufacturing Co., St. Paul, Minn., under the trade designation 3M Dual Brightness Enhancing Film™ and part number #98-0440-0023-4, with principal thermal expansion values of 85 parts per million per °C. (ppm/°C.) along a first, major axis in the film plane and 26 ppm/°C. along a second, orthogonal, minor axis in the film plane. The film thickness was 5.0 mils. Both surfaces of the film were unembossed.

Material B

A sample of reflective polarizing film as sold by Minnesota Mining and Manufacturing Co., St. Paul, Minn., under the trade designation 3M Dual Brightness Enhancing Film™ and part number #98-0440-0061-4, with principal thermal expansion values of 85.0 ppm/°C. along a major axis in the film plane and 26.0 ppm/°C. along a minor, orthogonal, axis in the film plane. The film thickness was 5.0 mils. One surface of the film was embossed to reduce the coefficient of friction of that surface.

Material C

A sample of diffuse reflective polarizing film made in accordance with Example 6 of co-pending U.S. patent application Ser. No. 09/006455, incorporated herein by reference, except that the outer layers were a blend comprising 52% by weight co-PEN, 45% by weight Questra-MA405, and 3% by weight Dylark 332-80. The film had principal thermal expansion values of 92.5 ppm/°C. along a major axis in the film plane and 20 ppm/°C. along a minor, orthogonal, axis in the film plane. The film thickness was 4.0 mils. Due to production conditions this film had a rough and smooth surface.

Comparative Example C1

A flat sheet of Material A was cut square with the major axis oriented 45° with respect to the frame edges. The z-clearance was 4.0 mils and with no x-y clearance. After thermal cycling, warping was observed with multiple (about 23–27) buckling nodes, or ripples. The buckles ran parallel to the minor axis. The film distortion was categorized as "severe" and the optical appearance of the film was very non-uniform.

Comparative Example C2

A flat sheet of Material A was cut square with the major axis oriented 45° with respect to the frame edges. The z-clearance was 4.0 mils and the x-y clearance was 0.031 inches, in both the x- and y-directions. After thermal cycling, warping was observed with multiple (12–14) buckling nodes. The buckles ran parallel to the minor axis. The film distortion was categorized as "slight" and the optical appearance of the film was somewhat non-uniform.

Comparative Example C3

A flat sheet of Material A was cut square with the major axis oriented 45° with respect to the frame edges. The z-clearance was 4.0 mils and the x-y clearance was 0.062 inches, in both the x- and y-directions. After thermal cycling, no warping was observed. The film distortion was categorized as "none" and the optical appearance of the film was uniform.

Examples C1, C2, and C3 illustrate the need for x-y clearance to prevent warping. The direction of the buckles illustrates that the differential thermal expansion (specifically along the major axis) between the glass panes and the film resulted in compressive stresses in the film plane surpassing the critical buckling stress of this film. From Equation A12 (using $\alpha_B$=10 ppm/°C.), the minimum uniform x-y clearance required for this assembly was calculated to be 0.042 inches, and for the above examples only Example C3 exceeded this minimum requirement. With Example C3, however, the amount of clearance was deemed excessive.

Example 1

Frame B was used. A flat sheet of Material B was cut via a high precision laser cutting technique to dimensions as specified using Equation A12. The specified dimensions included a cutting tolerance of 0.06% such that the calculated dimensions were reduced by 0.06% to account for cutting errors. The film axes were oriented 45° with respect to the frame edges, and the film was placed within Frame B of the LCD display module with the embossed surface facing the LCD panel. The LCD module was then reassembled including the stainless housing which bounded the frame. As specified by Equation A12, the shape of the film was a parallelogram with a vertical height of 7.500 inches and a horizontal base of 9.960 inches. The acute angle was 88.8° and the obtuse angle was 90.2°. The major axis of the film bisected the obtuse angle. After thermal cycling, no warping was observed. The film distortion was categorized as "none" and the optical appearance of the film was uniform.

The size for the film was calculated using Equation A12 and plugging in the following film values: $\alpha_{S1}$=85×10$^{-6}$/°C., $\alpha_{S2}$=26×10$^{-6}$/°C., $\Delta T$=60° C., $\theta$=45°, and $\phi$=0.1 (from Equation A14); frame values: $\alpha_{B1}$=10×10$^{-6}$/°C., $\alpha_{B2}$=10×10$^{-6}$/°C., and $\Delta T$=60° C., $\theta$=0°; and frame vertices at room temperature in the x-y plane in inches from the origin of: $R_B^0$=(0,0), (9.985,0.0), (9.985,7.531), and (0.0,7.531).

The maximum film vertices in the x-y plane in inches from the origin were determined as: $R_S^0$=(0,0), (9.960,0), (9.936,7.500), and (−0.024,7.500).

Example 1 illustrates a preferred method of the present invention, namely a non-rectangular shape of film housed within a rectangular frame with minimal tolerances. No film distortion or warping was observed after thermal cycling.

Example 2

The same construction was used as in Example 1, but with additional light management films positioned beneath the film sample. This resulted in less z-clearance. After thermal cycling, warping was observed. The warping pattern was asymmetric and appeared to be localized near the left vertical edge of the display. The film distortion was categorized as "severe" and the optical appearance was very non-uniform.

Example 2 illustrates that warping can occur when too little clearance in the z-direction is allowed. Due to the asymmetry of the warping pattern and the presence of an imprint pattern in the film due to the flange, it was believed that this sample was pinched by the flange, and thus constrained from free movement during thermal cycling. This resulted in excessive compressive stresses and the film buckled out-of-plane.

Example 3

Frame B was used. A flat sheet of Material B was cut as a rectangle having dimensions of 7.485 inches by 9.941 inches, dimensions smaller than those prescribed through calculation using Equation A12. After thermal cycling, warping was observed. The warping pattern was asymmetric, unlike Example C1, and appeared to be localized near the upper horizontal edge of the display. The film distortion was graded as severe and the optical appearance was very non-uniform.

Example 3 illustrates that too much clearance in the x-y plane can lead to excess film motion. It is believed that an edge of the film moved out of the film plane and past the flange and was thereafter constrained by the edge of the flange from moving during further thermal cycling. This resulted in excessive compressive stresses and the film buckled out-of-plane.

Example 4

Frame B was used. A flat sheet of Material A was cut as a rectangle having dimensions of 7.485 inches by 9.941 inches. After thermal cycling, warping was observed. The warping pattern was localized in two areas near the centroid of the film shape. A wet-out pattern was observed at the center of each warping pattern where the film had made intimate contact with the LCD panel. The film distortion was graded as severe and the optical appearance was very non-uniform.

Example 4 illustrates that warping can occur when the film is constrained from moving freely in the x-y plane due to adhesive-like forces between the film and display elements adjacent in the z-direction. At the high cycle temperature (85° C.), presumably Material A became tacky and adhered to the LCD panel element.

Example 5

Frame B was used. A flat sheet of Material B was cut via a high precision laser cutting technique to dimensions as specified using Equation A12. The specified dimensions included a cutting tolerance of 0.06%. In this example, the sample was cut to also fill the tab cavities of the frame. After thermal cycling, slight warping was observed near the left tab. The film distortion was categorized as "none" and the optical appearance of the film was uniform.

For the calculation, the film and frame values from Example 1 were used along with the following frame vertices at room temperature: $R_B{}^0$=(0,0), (9.985,0.0), (9.985, 5.692), (10.006,5.692), (10.006,5.883), (9.985,5.883), (9.985,7.531), (0,7.531), (0,5.883), (−0.130,5.883), (−0.130, 5.618), and (0,5.618). Plugging these values into Equation A12, the maximum film vertices were determined as: $R_S{}^0$= (0,0), (9.960,0), (9.942,5.669), (10.017,5.669), (10.017, 5.860), (9.941,5.860), (9.936,7.500), (−0.024,7.500), (−0.019,5.860), (−0.148,5.860), (−0.147,5.595), and (−0.018,5.595). Additionally the tabs were trimmed to allow for rotation, and thus the actual film vertices used in this example were given by: $R_S{}^0$=(0,0), (9.960,0), (9.942,5.674), (10.012,5.674), (10.012,5.855), (9.941,5.855), (9.936, 7.500), (−0.024,7.500), (−0.019,5.855), (−0.143,5.855), (−0.142,5.600), and (−0.018,5.600).

Example 6

The same construction as used in Example 5 was used, but the film tabs were trimmed to enable the centroid of the film to be coincident with the centroid of the frame. This was done by inspection. After thermal cycling, no warping was observed. The film distortion was categorized as "none" and the optical appearance of the film was uniform.

The film vertices of this example were: $R_S{}^+$=(0,0), (9.960, 0), (9.942,5.679), (10.012,5.679), (10.012,5.855), (9.941, 5.855), (9.936,7.500), (−0.024,7.500), (−0.019,5.855), (−0.143,5.855), (−0.142,5.623), and (−0.018,5.623)

The above Examples 5 and 6 illustrate the need for x-y clearance to prevent warping, and that the assembly preferably allows the clearance to be uniform along the horizontal edges of the frame. In example 5, because the tabs were positioned off-center towards the top edge of the frame, the calculation of the optimum film shape required greater clearance near the bottom edge of the frame. In Example 6, the tabs were trimmed to allow for more uniform clearance. The result was that less warping was observed in Example 6 versus Example 5.

Example 7

Frame B was used. A flat sheet of Material C was cut via a high precision laser cutting technique to dimensions as specified using Equation A12 and the film was placed within Frame B of the LCD display module with the rough surface facing the LCD panel. The specified dimensions included a cutting tolerance of 0.06% to account for cutting errors. After thermal cycling, no warping was observed. The film distortion was categorized as "none" and the optical appearance of the film was uniform.

The calculation was performed as in the previous examples to determine the film vertices at room temperature. The size for the film was calculated using Equation A12 and plugging in the following film values: $\alpha_{S1}$=92.5×10$^{-6}$/°C., $\alpha_{S2}$=20×10$^{-6}$/°C., $\Delta T$=60° C., $\theta$=45°, and $\phi$=−0.1°; frame values of: $\alpha_{B1}$=10×10$^{-6}$/°C., $\alpha_{B2}$=10×10$^{-6}$/°C., $\Delta T$=60° C., $\theta$=0°, and with $Q_B{}^+$=I. After calculation and including a small amount of tab trimming, the vertices used to cut the film were: $R_S{}^0$=(0,0), (9.961,−0.039), (9.961,5.634), (10.031,5.634), (10.031,5.815), (9.961,5.815), (9.961, 7.460), (0,7.498), (0,5.854), (−0.125, 5.854), (−0.125, 5.599), and (0,5.599).

What is claimed is:

1. An assembly comprising:
 a frame having an internal bounding edge enclosing a substantially rectangular internal area; and
 a substantially planar anisotropic film contained within the bounding edge of the frame, the film having a first thermal expansion direction in the plane of the film and a second thermal expansion direction in the plane of the film, the second expansion direction having a lower coefficient of thermal expansion than the first expansion direction,
 wherein the film has at least two principal edges joining at a non-right angle, the non-right angle being selected to reduce clearance along the second expansion direction while allowing sufficient room between the film and the frame for thermal expansion in the first expansion direction.

2. The assembly of claim 1, wherein the film forms a parallelogram at the ambient reference temperature.

3. The assembly of claim 1, wherein the film is a light management film.

4. The assembly of claim 3, wherein the film is a uniaxially oriented reflective polarizer.

5. An assembly comprising:
 a frame having an internal bounding edge enclosing an internal area, the bounding edge having a shape defined by a set of boundary edge vertices in an x-y plane; and
 a film contained within the frame, the film having a first coefficient of thermal expansion positioned along a first expansion axis in the x-y plane and a second coefficient of thermal expansion positioned along a second expansion axis in the x-y plane, the first coefficient of expansion being greater than the second coefficient of expansion,
 wherein at an ambient reference temperature the film has a shape different from the shape of the bounding edge of the frame, the film shape being selected to reduce clearance along the second expansion axis and to allow sufficient room for expansion of the film along the first expansion axis for temperatures up to a predetermined elevated reference temperature.

6. The assembly of claim 5, wherein at the ambient reference temperature the film is no larger than a set of maximum film edge vertices in the x-y plane determined according to $$R_S{}^0 = O_S{}^0 + (Q_S{}^+ \cdot D_S{}^+)^{-1} \cdot (-O_S{}^0 - Tr_S{}^+) + (Q_S{}^+ \cdot D_S{}^+)^{-1} \cdot D_B{}^+ \cdot R_B{}^0$$

wherein $R_S{}^0$ is the set of maximum film edge vertices at the ambient reference temperature, $R_B{}^0$ is the set of boundary edge vertices at the ambient reference temperature, $D_S{}^+$ is an expansion displacement ratio tensor for the film, $D_B{}^+$ is an expansion displacement ratio tensor for the frame, $O_S{}^0$ and is a center of rotation of the film, $Tr_S{}^+$ is a solid body translation of $O_S{}^0$, and $Q_S{}^+$ is a solid body rotation tensor for the film.

7. The assembly of claim 6, wherein the frame further comprises tabs, tab cavities, pins, or slots whose positions are defined by vertices in the x-y plane, the vertices included in the set of boundary edge vertices of the frame.

8. The assembly of claim 5, further comprising a liquid crystal light modulator oriented in the x-y plane aligned with and positioned proximate to the frame.

9. The assembly of claim 5, wherein the film is a uniaxially oriented reflective polarizer.

10. A method for sizing an anisotropic film to fit in a frame comprising the steps of:
 (a) determining a set of vertices in an x-y plane defining an area enclosed by a frame;
 (b) providing a substantially planar film having a first coefficient of thermal expansion along a first expansion axis in the plane of the film and a second, different, coefficient of thermal expansion along a second, different, expansion axis in the plane of the film;

(c) calculating a set of maximum film edge vertices in the x-y plane given an ambient reference temperature and an elevated reference temperature higher than the ambient reference temperature using the formula $$R_S^0 = O_S^0 + (Q_S^+ \cdot D_S^+)^{-1} \cdot (-O_S^0 - Tr_S^+) + (Q_S^+ \cdot D_S^+)^{-1} \cdot D_B^+ 19 \, R_B^0$$

wherein $R_S^0$ is the set of maximum film edge vertices at the ambient reference temperature, $R_B^0$ is the set of boundary edge vertices at the ambient reference temperature, $D_S^+$ is an expansion displacement ratio tensor for the film, $D_B^+$ is an expansion displacement ratio tensor for the frame, $O_S^0$ is a center of rotation of the film, $Tr_S^+$ is a solid body translation of $O_S^0$, and $Q_S^+$ is a solid body rotation tensor for the film; and (d) cutting the film to have a size and an orientation at the ambient reference temperature selected to reduce clearance, the size being no larger than an area defined by the set of maximum film edge vertices calculated in the calculating step.

11. An assembly comprising a frame having an internal bounding edge enclosing an internal area;

an anisotropic film having principal edges contained with the internal area of the frame; and a positioning system comprising at least one positioning element of the film and at least one positioning element of the frame, each positioning element of the film being at least one of a protrusion from a principal edge of the film or an indention in a principal edge of the film, and each positioning element of the frame being one of an indention or protrusion at the bounding edge of the frame complementing the position, shape, and size of a corresponding positioning element of the film, wherein the positioning system fixes at least one point of the film from moving relative to the frame in at least one direction parallel to the film due to thermal expansion of the film for temperatures ranging between a predetermined ambient reference temperature and a predetermined elevated reference temperature.

* * * * *

UNITED STATES PATENT AND TRADEMARK OFFICE
CERTIFICATE OF CORRECTION

PATENT NO.    : 6,160,663
DATED         : December 12, 2000
INVENTOR(S)   : William W. Merrill et al.

It is certified that error appears in the above-identified patent and that said Letters Patent is hereby corrected as shown below:

Column 2,
Line 56, delete the period after " electromagnetic"

Column 9,
Line 27, " flame " should read -- frame --

Column 11,
Lines 30-61, should read as follows:

$$-- A3 \qquad \underline{l} = (\underline{\underline{I}} + \Delta T \underline{\underline{\alpha}}) \cdot \underline{l}_0 = \underline{\underline{D}} \cdot \underline{l}_0$$

where $\underline{l}_0$ and $\underline{l}$ are vector quantities of the initial and final lengths, $\underline{\underline{I}}$ is the identity tensor, and $\underline{\underline{\alpha}}$ is the thermal expansion tensor, a symmetric second order tensor. The quantity in parenthesis in Equation A3 is denoted as the expansion displacement ratio tensor, $\underline{\underline{D}}$. At the initial reference temperature, $\Delta T$ is zero and the expansion displacement ratio is the identity. For an isotropic film, Equation A3 readily reduces to Equation A2. By writing Equation A3 in terms of tensors, the change in size and shape a film undergoes due to thermal expansion is completely described. The assumption that $\underline{\underline{\alpha}}$ is a symmetric second order tensor can be verified by examination of the apparent angular dependence of the thermal expansion coefficient. A symmetric second order tensor can be expressed in canonical form:

UNITED STATES PATENT AND TRADEMARK OFFICE
CERTIFICATE OF CORRECTION

PATENT NO. : 6,160,663 B1
DATED : December 12, 2000
INVENTOR(S) : William W. Merrill et al.

It is certified that error appears in the above-identified patent and that said Letters Patent is hereby corrected as shown below:

A4
$$\underline{\underline{\alpha}} = \begin{pmatrix} \alpha_1 & 0 \\ 0 & \alpha_2 \end{pmatrix}$$

where $\alpha_1$ and $\alpha_2$ are the principal values of thermal expansion (the maximum and minimum values) measured along the principal directions in the film plane.

The thermal expansion tensor, $\underline{\underline{\alpha}}$, can also be written in an arbitrary coordinate reference frame in which the first principal material axis is rotated by an angle $\theta$ from a first coordinate axis of the arbitrary reference frame. The generalized thermal expansion tensor, $\underline{\underline{\alpha}}^\theta$, is therefore:

A5
$$\underline{\underline{\alpha}}^\theta = \underline{\underline{\Omega}} \cdot \underline{\underline{\alpha}} \cdot \underline{\underline{\Omega}}^t$$

where $\underline{\underline{\Omega}}$ is the coordinate transformation tensor for a rigid rotation given by: --

Signed and Sealed this

Twenty-sixth Day of March, 2002

Attest:

JAMES E. ROGAN

UNITED STATES PATENT AND TRADEMARK OFFICE
CERTIFICATE OF CORRECTION

PATENT NO. : 6,160,663
DATED : December 12, 2000
INVENTOR(S) : William W. Merrill et al.

It is certified that error appears in the above-identified patent and that said Letters Patent is hereby corrected as shown below:

Column 2,
Line 56, delete the period after "electromagnetic"

Column 9,
Line 27, " flame " should read -- frame --

Column 11,
Lines 30-61, should read as follows:

$$-- A3 \qquad \underline{l} = (\underline{I} + \Delta T \underline{\underline{\alpha}}) \cdot \underline{l}_0 = \underline{\underline{D}} \cdot \underline{l}_0$$

where $\underline{l}_0$ and $\underline{l}$ are vector quantities of the initial and final lengths, $\underline{I}$ is the identity tensor, and $\underline{\underline{\alpha}}$ is the thermal expansion tensor, a symmetric second order tensor. The quantity in parenthesis in Equation A3 is denoted as the expansion displacement ratio tensor, $\underline{\underline{D}}$. At the initial reference temperature, $\Delta T$ is zero and the expansion displacement ratio is the identity. For an isotropic film, Equation A3 readily reduces to Equation A2. By writing Equation A3 in terms of tensors, the change in size and shape a film undergoes due to thermal expansion is completely described. The assumption that $\underline{\underline{\alpha}}$ is a symmetric second order tensor can be verified by examination of the apparent angular dependence of the thermal expansion coefficient. A symmetric second order tensor can be expressed in canonical form:

UNITED STATES PATENT AND TRADEMARK OFFICE
CERTIFICATE OF CORRECTION

PATENT NO. : 6,160,663
DATED : December 12, 2000
INVENTOR(S) : William W. Merrill et al.

It is certified that error appears in the above-identified patent and that said Letters Patent is hereby corrected as shown below:

A4
$$\underline{\underline{\alpha}} = \begin{pmatrix} \alpha_1 & 0 \\ 0 & \alpha_2 \end{pmatrix}$$

where $\alpha_1$ and $\alpha_2$ are the principal values of thermal expansion (the maximum and minimum values) measured along the principal directions in the film plane.

The thermal expansion tensor, $\underline{\underline{\alpha}}$, can also be written in an arbitrary coordinate reference frame in which the first principal material axis is rotated by an angle θ from a first coordinate axis of the arbitrary reference frame. The generalized thermal expansion tensor, $\underline{\underline{\alpha}}^\theta$, is therefore:

A5
$$\underline{\underline{\alpha}}^\theta = \underline{\underline{\Omega}} \cdot \underline{\underline{\alpha}} \cdot \underline{\underline{\Omega}}^t$$

where $\underline{\underline{\Omega}}$ is the coordinate transformation tensor for a rigid rotation given by: --

This certificate supersedes Certificate of Correction issued March 26, 2002.

Signed and Sealed this

Thirtieth Day of April, 2002

*Attest:*

*Attesting Officer*

JAMES E. ROGAN
*Director of the United States Patent and Trademark Office*